US012748740B2

(12) United States Patent
Xu et al.

(10) Patent No.: US 12,748,740 B2
(45) Date of Patent: Sep. 29, 2026

(54) KEY-VALUE PAIR RETRIEVAL METHOD AND APPARATUS, AND STORAGE MEDIUM

(71) Applicants: HUAWEI TECHNOLOGIES CO., LTD., Shenzhen (CN); University of Science and Technology of China, Hefei (CN)

(72) Inventors: Yun Xu, Hefei (CN); Pengcheng Wang, Nanjing (CN); Fei Chen, Nanjing (CN); Long Yan, Nanjing (CN); Lei Han, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 51 days.

(21) Appl. No.: 18/818,307

(22) Filed: Aug. 28, 2024

(65) Prior Publication Data

US 2024/0419647 A1 Dec. 19, 2024

Related U.S. Application Data

(63) Continuation of application No. PCT/CN2022/137906, filed on Dec. 9, 2022.

(30) Foreign Application Priority Data

Feb. 28, 2022 (CN) ......................... 202210188396.1

(51) Int. Cl.
*G06F 16/22* (2019.01)

(52) U.S. Cl.
CPC ...... *G06F 16/2237* (2019.01); *G06F 16/2255* (2019.01)

(58) Field of Classification Search
None
See application file for complete search history.

(56) References Cited

U.S. PATENT DOCUMENTS 6,182,186 B1 * 1/2001 Daynes ..................... G06F 9/52 710/200
8,626,770 B2 * 1/2014 He ..................... G06F 16/2465 707/769

(Continued)

FOREIGN PATENT DOCUMENTS

CN 107567621 A 1/2018
CN 111274245 A 6/2020

OTHER PUBLICATIONS

Zou et al., "HMEH: write-optimal extendible hashing for hybrid DRAM-NVM memory," 36th International Conference on Massive Storage Systems and Technology (MSST 2020), XP093281131, total 11 pages (Oct. 2020).

(Continued)

*Primary Examiner* — Aleksandr Kerzhner
*Assistant Examiner* — Anugeetha Kunjithapatham
(74) *Attorney, Agent, or Firm* — Leydig, Voit & Mayer, Ltd.

(57) ABSTRACT

A key is divided into a plurality of key fields. Then, a corresponding first bit is determined from a bitmap top (BT) based on a first key field in a front part. Finally, a target bitmap bottom (BB) is determined, based on a second key field in a rear part, from a plurality of BBs corresponding to the first bit. In this way, for keys having a same first key field, a plurality of same BBs can be located through the BT.

20 Claims, 4 Drawing Sheets

(56) References Cited

U.S. PATENT DOCUMENTS

| | | | | |
|---|---|---|---|---|
| 10,565,197 | B2 * | 2/2020 | Macy | G06F 16/2455 |
| 10,671,641 | B1 * | 6/2020 | Holenstein | G06F 16/284 |
| 2010/0174670 | A1 * | 7/2010 | Malik | G06F 18/231 706/12 |
| 2011/0270871 | A1 * | 11/2011 | He | G06F 16/24556 707/769 |
| 2011/0282917 | A1 * | 11/2011 | Desai | G06F 16/1827 707/822 |
| 2014/0115216 | A1 * | 4/2014 | Jacobs | G06F 9/52 710/200 |
| 2022/0374404 | A1 * | 11/2022 | Johnson | H03M 7/30 |

OTHER PUBLICATIONS

Nam et al., "Write-Optimized Dynamic Hashing for Persistent Memory," USENIX Association, 17th USENIX Conference on File and Storage Technologies 31, XP061031693, total 14 pages (Feb. 2019).

Li et al., "HASDH: A Hotspot-Aware and Scalable Dynamic Hashing for Hybrid DRAM-NVM Memory," 2021 IEEE 39th International Conference on Computer Design (ICCD), XP034055880, total 8 pages (Oct. 2021).

Zhang et al., "Reducing the storage overhead of main-memory OLTP databases with hybrid indexes[," Proceedings of the 2016 International Conference on Management of Data, Total 15 pages (Jan. 2016).

Kraska et al., "The case for learned index structures," Proceedings of the 2018 International Conference on Management of Data, arXiv:1720.1208v3 [cs.DB], May 27, 2018, Total 30 pages (Apr. 2018).

Leis et al., "The adaptive radix tree: ARTful indexing for main-memory databases," 2013 IEEE 29th International Conference on Data Engineering (ICDE), IEEE, Total 12 pages (Apr. 2013).

Binna et al., "Hot: A height optimized trie index for main-memory database systems," Proceedings of the 2018 International Conference on Management of Data, Total 14 pages (Jun. 10-15, 2018).

Ferragina et al., "An experimental study of an opportunistic index," SODA '01: Proceedings of the twelfth annual ACM-SIAM symposium on Discrete algorithms, Total 10 pages (Jan. 2001).

Agarwal et al., "Succinct: Enabling queries on compressed data[." 12th {USENIX} Symposium on Networked Systems Design and Implementation (NSDI '15), Total 15 pages (May 4-6, 2015).

Galakatos et al., "FITing-tree: A data-aware index structure," Proceedings of the 2019 International Conference on Management of Data, arXiv:1801.1027v2 [cs.DB}. Jun. 25, 2019, Total 18 pages (Mar. 2020).

* cited by examiner

| | First field (8 bits) | Second field (8 bits) | Third field (64 bits) |
|---|---|---|---|
| | Abrupt change position | Abruptly changed byte | Bit vector |
| Single difference entry A | 0 | 0x02 | 010000000...0010 |
| Single difference entry B | 3 | 0x03 | 000010000...0000 |
| | ... | ... | ... |
| Aggregated difference entry group | 10000000 | 00000000 | 0x0102030401010105 |
| | 10000000 | 00000000 | ... |
| | ... | ... | ... |
| | 10000000 | 00000000 | ... |

KEY-VALUE PAIR RETRIEVAL METHOD AND APPARATUS, AND STORAGE MEDIUM

CROSS-REFERENCE TO RELATED APPLICATIONS

This application is a continuation of International Application No. PCT/CN2022/137906, filed on Dec. 9, 2022, which claims priority to Chinese Patent Application No. 202210188396.1, filed on Feb. 28, 2022. The disclosures of the aforementioned applications are hereby incorporated by reference in their entireties.

STATEMENT OF JOINT RESEARCH AGREEMENT

The subject matter and the claimed invention were made by or on the behalf of University of Science and Technology of China, of Baohe District, Hefei City, Anhui Province, P.R. China and Huawei Technologies Co., Ltd., of Shenzhen, Guangdong Province, P.R. China, under a joint research agreement titled "Low-Space Low-Latency Indexing and Remote Indirect Memory Access Technology Project". The joint research agreement was in effect on or before the claimed invention was made, and the claimed invention was made as a result of activities undertaken within the scope of the joint research agreement.

TECHNICAL FIELD

This application relates to the communication field, and in particular, to a key-value pair retrieval method and apparatus, and a storage medium.

BACKGROUND

With continuous development of network technologies, social media, and internet-of-things devices, massive data is generated. The data may be stored and managed by using a key-value storage system. In the key-value storage system, a data organization manner is represented as a key-value pair. A value in a key-value pair may be data of any type, structure, and size, and a key corresponding to the value is used to uniquely identify the value. In the key-value storage system, data retrieval performance mainly depends on an efficient indexing technology. However, conventional indexing technologies such as a vEB index, a prefix tree index, and a full-text index all have a problem of an excessively high proportion of index storage space.

SUMMARY

Embodiments of this application provide a key-value pair retrieval method, apparatus, and device, a storage medium, and a program product, to reduce a proportion of storage space occupied by an index in a key-value storage system. Technical solutions are as follows.

According to a first aspect, a key-value pair retrieval method is provided. The method includes: obtaining a processing request, where the processing request includes a target key and a subscript index value of a target value corresponding to the target key, the target key includes a first key field and a second key field, and the first key field is located before the second key field; obtaining, from a bitmap top (BT) based on the first key field, a bit value of a first bit corresponding to the first key field; when the bit value of the first bit is a first value, determining, based on the second key field and in a plurality of bitmap bottoms (BBs) corresponding to the first bit, a target BB corresponding to the target key, where each BB is used to store a plurality of values; and performing a value operation in the target BB based on the subscript index value.

In embodiments of this application, a key is divided into a plurality of key fields. Then, the corresponding first bit is determined from the BT based on the first key field in a front part. Finally, the target BB is determined, based on the second key field in a rear part, from a plurality of BBs corresponding to the first bit. In this way, for keys having a same first key field, a plurality of same BBs can be located through the BT. In other words, in embodiments of this application, indexes of a common part of the keys are integrated, thereby reducing a proportion of space occupied by the index.

Optionally, an implementation process of determining, based on the second key field and in bitmap bottoms BBs corresponding to the first bit, a target BB corresponding to the target key may be: obtaining a first hash table corresponding to the first bit; and determining the target BB in the plurality of BBs based on the second key field and the first hash table.

In a possible case, each entry in the first hash table stores indication information of one BB. On this basis, a corresponding entry in the first hash table is determined based on the second key field, indication information of the target BB is obtained from the determined entry, and the target BB is determined in the plurality of BBs based on the obtained indication information of the target BB.

In another possible case, the second key field includes a first subfield and a second subfield, and an implementation process of determining the target BB in the plurality of BBs based on the second key field and the first hash table is: determining, based on the first subfield and the first hash table, a target bitmap middle BM corresponding to the target key, where the target BM stores indication information of a second hash table; obtaining the second hash table based on the indication information of the second hash table, where the second hash table stores indication information of the plurality of BBs; and determining the target BB based on the second subfield and the second hash table.

In this case, each entry in the first hash table corresponding to the BT stores indication information of one BM. Each BM stores indication information of a hash table middle corresponding to the BM, and an entry of each hash table middle stores indication information of one BB. On this basis, after the target BM is determined, the hash table middle, that is, the second hash table, corresponding to the target BM is determined based on the indication information of the second hash table in the target BM. Then, a corresponding entry is determined in the second hash table based on the second subfield, and the target BB is determined based on the indication information of the BB in the determined entry.

It will be appreciated that, in this application, the second key field may be further divided, to retrieve the corresponding BM based on the first subfield in a front part and the first hash table, to obtain the second hash table in the BM. In this way, for keys that also include the first key field and a prefix of the first subfield, BBs corresponding to these keys can be retrieved through a hash table (that is, the second hash table), thereby reducing a data scale of the hash table and improving operation efficiency of the hash table. In addition, indexes of more common parts of the keys can be integrated through the BT and the BM, thereby further reducing the proportion of the space occupied by the index.

Optionally, the target BB stores a reference value and a value compression table, where the value compression table is used to store difference information between another value and the reference value.

In this application, a plurality of values may be stored in the BB by storing the reference value and the difference information between the another value and the reference value. In this way, storage of redundant fields in the plurality of values can be reduced, thereby reducing storage space occupied by the value and improving a value compression rate.

When a plurality of values are stored by using a value compression table, in a possible case, the value compression table includes a plurality of single difference entries, one single difference entry is used to store one piece of difference information, the difference information includes an abrupt change position, an abruptly changed byte, and a corresponding bit vector, the abrupt change position indicates a position of a changed byte in the another value compared with the reference value, the abruptly changed byte is a changed byte in the another value compared with the reference value, the bit vector includes a plurality of bits, one bit corresponds to one value, and a bit value of a bit that is in the plurality of bits and that corresponds to the another value is a second value.

In another possible case, the value compression table further includes at least one aggregated difference entry, one aggregated difference entry is obtained by aggregating a plurality of single difference entries including a same first abrupt change position and different abruptly changed bytes, the aggregated difference entry includes an aggregation identifier, the first abrupt change position, and a byte storage field, and the byte storage field sequentially stores, based on a sequence of values corresponding to the bits in the bit vector, bytes located at the first abrupt change position in the values. In other words, in this application, the plurality of single difference entries including a same abrupt change position and different abruptly changed bytes may be aggregated, to obtain an aggregated difference entry, thereby reducing storage overheads of the entry.

Optionally, the obtained processing request may be a data insertion request, and the data insertion request further includes the target value. Based on this, an implementation process of performing a value operation in the target BB based on the subscript index value may be: comparing each byte in the target value with a corresponding byte in the reference value, to obtain an abrupt change position and an abruptly changed byte in the target value; and inserting difference information between the target value and the reference value into the value compression table based on the subscript index value, and the abrupt change position and the abruptly changed byte in the target value.

In a possible implementation, when the value compression table includes a first single difference entry, a bit value of the $n^{th}$ bit in a bit vector in the first single difference entry is updated to the second value, to implement insertion of the target value, where n is determined based on the subscript index value, and the first single difference entry is a single difference entry including the abrupt change position and the abruptly changed byte in the target value.

In another possible implementation, when the value compression table does not include the abruptly changed byte in the target value, and a quantity of second single difference entries included in the value compression table is less than a first threshold, a bit vector of the target value is generated based on the subscript index value, where a bit value of the $n^{th}$ bit in the bit vector of the target value is the second value, n is determined based on the subscript index value, and the second single difference entry is a single difference entry including the abrupt change position of the target value; and a single difference entry is generated based on the abrupt change position, the abruptly changed byte, and the bit vector of the target value, and the generated single difference entry is inserted into the value compression table, to implement insertion of the target value.

In still another possible implementation, when the value compression table does not include the abruptly changed byte in the target value, and a quantity of second single difference entries included in the value compression table is no less than a first threshold, the second single difference entry, the abruptly changed byte in the target value, and the subscript index value is aggregated to obtain a target aggregated difference entry, to implement insertion of the target value, where the second single difference entry is a single difference entry including the abrupt change position of the target value, the first threshold is greater than 1, and storage space occupied by the target aggregated difference entry is no greater than storage space occupied by the plurality of second single difference entries. In other words, in this implementation, a plurality of single difference entries including an abrupt change position that is the same as the abrupt change position of the target value but whose abruptly changed bytes are different may be aggregated with the target value, to obtain the target aggregated difference entry, thereby reducing space occupied by the entry, and reducing storage overheads of the value compression table.

Optionally, the obtained processing request may be a data query request. Based on this, an implementation process of performing a value operation in the target BB based on the subscript index value may be: when the value compression table includes a third single difference entry, the target value is obtained based on an abrupt change position and an abruptly changed byte in the third single difference entry, an $n^{th}$ byte in a byte storage field included in each aggregated difference entry in the value compression table, and the reference value, where the third single difference entry is a single difference entry in which a bit value of the $n^{th}$ bit in a bit vector is the second value, and n is determined based on the subscript index value.

Optionally, the obtained processing request may be a data deletion request. Based on this, an implementation process of performing a value operation in the target BB based on the subscript index value may be: when the value compression table includes a third single difference entry, updating a bit value of the $n^{th}$ bit in a bit vector of the third single difference entry to a third value, where the third single difference entry is a single difference entry in which the bit value of the $n^{th}$ bit in the bit vector is the second value, n is determined based on the subscript index value, and the third value is different from the second value; and when the value compression table includes a first aggregated difference entry, updating, based on a second abrupt change position included in the first aggregated difference entry, an $n^{th}$ byte in a byte storage field in the first aggregated difference entry to a byte at the second abrupt change position in the reference value, where the $n^{th}$ byte in the byte storage field in the first aggregated difference entry is an abruptly changed byte at the second abrupt change position in the target value.

Optionally, after the first aggregated difference entry is updated, when a quantity of abruptly changed bytes in a byte storage field in an updated first aggregated difference entry is less than a first threshold, the first aggregated difference entry may also be split into a plurality of single difference entries again. In other words, if a quantity of types of the abruptly changed byte is less than the first threshold, it indicates that even if the updated aggregated difference entry is split, a quantity of single difference entries obtained is less than the first threshold, and storage space occupied by the plurality of single difference entries is less than storage space occupied by the aggregated difference entry. In this case, a computing device may restore the updated aggregated difference entry to the plurality of single difference entries.

Optionally, the BT corresponds to a BT read-write lock, where the BT read-write lock indicates to perform read-write locking on the BT when the BT is accessed based on the processing request. Concurrent access to the BT may be controlled by using the BT read-write lock.

Optionally, before the performing a value operation in the target BB, the method further includes: obtaining, from a lock pool based on a read-write lock label of the target BB, a read-write lock corresponding to the target BB, where the read-write lock corresponding to the target BB indicates to perform read-write locking on the target BB in a process of performing the value operation in the target BB based on the subscript index value, the lock pool includes a plurality of read-write locks, and at least one of the plurality of read-write locks corresponds to at least two BBs. In other words, concurrent access to the BB may be controlled by using the BB read-write lock. In addition, because there are a large quantity of BBs, a plurality of BBs may share a same read-write lock. In this way, space consumption of the read-write lock can be reduced.

Optionally, after the performing a value operation in the target BB based on the subscript index value, the read-write lock corresponding to the target BB may be further released.

According to a second aspect, a key-value pair retrieval apparatus is provided. The key-value pair retrieval apparatus has a function of implementing a key-value pair retrieval behavior in the first aspect. The key-value pair retrieval apparatus includes at least one module, and the at least one module is configured to implement the key-value pair retrieval method provided in the first aspect.

For example, the key-value pair retrieval apparatus includes a first obtaining module, a second obtaining module, a determining module, and a processing module.

The first obtaining module is configured to obtain a processing request, where the processing request includes a target key and a subscript index value of a target value corresponding to the target key, the target key includes a first key field and a second key field, and the first key field is located before the second key field. The second obtaining module is configured to obtain, from a bitmap top BT based on the first key field, a bit value of a first bit corresponding to the first key field. The determining module is configured to: when the bit value of the first bit is a first value, determine, based on the second key field and in a plurality of bitmap bottoms BBs corresponding to the first bit, a target BB corresponding to the target key, where each BB is used to store a plurality of values. The processing module is configured to perform a value operation in the target BB based on the subscript index value.

Optionally, the determining module is configured to: obtain a first hash table corresponding to the first bit; and determine the target BB in the plurality of BBs based on the second key field and the first hash table.

Optionally, the second key field includes a first subfield and a second subfield, and the determining module is configured to: determine, based on the first subfield and the first hash table, a target bitmap middle BM corresponding to the target key, where the target BM stores indication information of a second hash table; obtain the second hash table based on the indication information of the second hash table, where the second hash table stores indication information of the plurality of BBs; and determine the target BB based on the second subfield and the second hash table.

Optionally, the target BB stores a reference value and a value compression table, where the value compression table is used to store difference information between another value and the reference value.

Optionally, the value compression table includes a plurality of single difference entries, one single difference entry is used to store one piece of difference information, the difference information includes an abrupt change position, an abruptly changed byte, and a corresponding bit vector, the abrupt change position indicates a position of a changed byte in the another value compared with the reference value, the abruptly changed byte is a changed byte in the another value compared with the reference value, the bit vector includes a plurality of bits, one bit corresponds to one value, and a bit value of a bit that is in the plurality of bits and that corresponds to the another value is a second value.

Optionally, the value compression table further includes at least one aggregated difference entry, one aggregated difference entry is obtained by aggregating a plurality of single difference entries including a same first abrupt change position and different abruptly changed bytes, the aggregated difference entry includes an aggregation identifier, the first abrupt change position, and a byte storage field, and the byte storage field sequentially stores, based on a sequence of values corresponding to the bits in the bit vector, bytes located at the first abrupt change position in the values.

Optionally, the processing request is a data insertion request, the data insertion request further includes the target value, and the processing module is configured to: compare each byte in the target value with a corresponding byte in the reference value, to obtain an abrupt change position and an abruptly changed byte in the target value; and insert difference information between the target value and the reference value into the value compression table based on the subscript index value, and the abrupt change position and the abruptly changed byte in the target value.

Optionally, the processing module is configured to: when the value compression table includes a first single difference entry, update a bit value of the $n^{th}$ bit in a bit vector in the first single difference entry to the second value, where n is determined based on the subscript index value, and the first single difference entry is a single difference entry including the abrupt change position and the abruptly changed byte in the target value.

Optionally, the processing module is configured to: when the value compression table does not include the abruptly changed byte in the target value, and a quantity of second single difference entries included in the value compression table is less than a first threshold, generate a bit vector of the target value based on the subscript index value, where a bit value of the $n^{th}$ bit in the bit vector of the target value is the second value, n is determined based on the subscript index value, and the second single difference entry is a single difference entry including the abrupt change position of the target value; and generate a single difference entry based on the abrupt change position, the abruptly changed byte, and the bit vector of the target value, and insert the generated single difference entry into the value compression table.

Optionally, the processing module is configured to: when the value compression table does not include the abruptly changed byte in the target value, and a quantity of second single difference entries included in the value compression table is no less than a first threshold, aggregate the second single difference entry, the abruptly changed byte in the target value, and the subscript index value, to obtain a target aggregated difference entry, where the second single difference entry is a single difference entry including the abrupt change position of the target value, the first threshold is greater than 1, and storage space occupied by the target aggregated difference entry is no greater than storage space occupied by the plurality of second single difference entries.

Optionally, the processing request is a data query request, and the processing module is configured to: when the value compression table includes a third single difference entry, obtain the target value based on an abrupt change position and an abruptly changed byte in the third single difference entry, an $n^{th}$ byte in a byte storage field included in each aggregated difference entry in the value compression table, and the reference value, where the third single difference entry is a single difference entry in which a bit value of the $n^{th}$ bit in a bit vector is the second value, and n is determined based on the subscript index value.

Optionally, the processing request is a data deletion request, and the processing module is configured to: when the value compression table includes a third single difference entry, update a bit value of the $n^{th}$ bit in a bit vector of the third single difference entry to a third value, where the third single difference entry is a single difference entry in which the bit value of the $n^{th}$ bit in the bit vector is the second value, n is determined based on the subscript index value, and the third value is different from the second value; and when the value compression table includes a first aggregated difference entry, update, based on a second abrupt change position included in the first aggregated difference entry, an $n^{th}$ byte in a byte storage field in the first aggregated difference entry to a byte at the second abrupt change position in the reference value, where the $n^{th}$ byte in the byte storage field in the first aggregated difference entry is an abruptly changed byte at the second abrupt change position in the target value.

Optionally, the processing module is further configured to: when a quantity of abruptly changed bytes in a byte storage field in an updated first aggregated difference entry is less than a first threshold, split the first aggregated difference entry into a plurality of single difference entries.

Optionally, the BT corresponds to a BT read-write lock, where the BT read-write lock indicates to perform read-write locking on the BT when the BT is accessed based on the processing request.

Optionally, the apparatus is further configured to obtain, from a lock pool based on a read-write lock label of the target BB, a read-write lock corresponding to the target BB, where the read-write lock corresponding to the target BB indicates to perform read-write locking on the target BB in a process of performing the value operation in the target BB based on the subscript index value, the lock pool includes a plurality of read-write locks, and at least one of the plurality of read-write locks corresponds to at least two BBs.

Optionally, the apparatus is further configured to release the read-write lock corresponding to the target BB.

According to a third aspect, a key-value pair retrieval device is provided. The key-value pair retrieval device includes a processor and a memory. The memory is configured to store a program that supports the key-value pair retrieval device in performing the key-value pair retrieval method provided in the first aspect, and store data used to implement the key-value pair retrieval method according to the first aspect. The processor is configured to execute the program stored in the memory.

According to a fourth aspect, a computer-readable storage medium is provided. The computer-readable storage medium stores instructions. When the instructions are run on a computer, the computer is enabled to perform the key-value pair retrieval method according to the first aspect.

According to a fifth aspect, a computer program product including instructions is provided. When the computer program product runs on a computer, the computer is enabled to perform the key-value pair retrieval method according to the first aspect.

Technical effects obtained in the second aspect to the fifth aspect are similar to technical effects obtained by the corresponding technical means in the first aspect. Details are not described herein again.

Technical solutions provided in embodiments of this application achieve at least the following beneficial effects.

In embodiments of this application, a key is divided into a plurality of key fields. Then, a corresponding first bit is determined from a BT based on a first key field in a front part. Finally, a target BB is determined, based on a second key field in a rear part, from a plurality of BBs corresponding to the first bit. In this way, for keys having a same first key field, a plurality of same BBs can be located through the BT. In other words, in embodiments of this application, indexes of a common part of the keys are integrated, thereby reducing a proportion of space occupied by the index.

DESCRIPTION OF EMBODIMENTS

To make objectives, technical solutions, and advantages of embodiments of this application clearer, the following further describes implementations of this application in detail with reference to the accompanying drawings.

Before embodiments of this application are described in detail, an implementation environment of embodiments of this application is described first.

Figure 1:
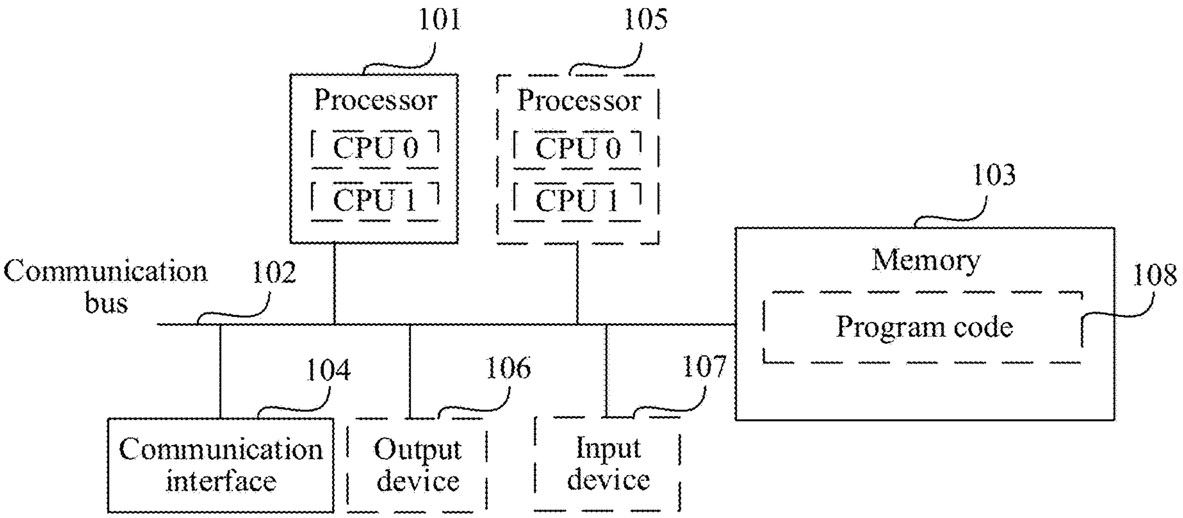
FIG. 1 is a diagram of a structure of a key-value pair retrieval device according to an embodiment of this application.

FIG. 1 is a diagram of a structure of a key-value pair retrieval device according to an embodiment of this application. The key-value pair retrieval method provided in the following embodiments may be performed by using the key-value pair retrieval device. As shown in FIG. 1, the key-value pair retrieval device may include one or more processors 101, a communication bus 102, a memory 103, and one or more communication interfaces 104.

The processor 101 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The communication bus 102 is configured to transmit information between the foregoing components. The communication bus 102 may be classified into an address bus, a data bus, a control bus, or the like. For ease of representation, only one thick line is used to represent the bus in the figure, but this does not mean that there is only one bus or only one type of bus.

The memory 103 may be a read-only memory (ROM), a random access memory (RAM), an electrically erasable programmable read-only memory (EEPROM), an optical disc (CD-ROM), a compact disc, a laser disc, a digital versatile disc, a Blu-ray disc, or the like), a magnetic disk storage medium or another magnetic storage device, or any other medium that can be used to carry or store expected program code in a form of instructions or a data structure and that is accessible to a computer. However, this is not limited hereto. The memory 103 may exist independently, and is connected to the processor 101 through the communication bus 102. Alternatively, the memory 103 and the processor 101 may be integrated together.

The communication interface 104 is configured to communicate with another device or a communication network by using any apparatus like a transceiver. The communication interface 104 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

In some embodiments, the key-value pair retrieval device may include a plurality of processors, for example, the processor 101 and a processor 105 that are shown in FIG. 1. Each of the processors may be a single-core processor, or may be a multi-core processor. The processor herein may be one or more devices, circuits, and/or processing cores configured to process data (for example, computer program instructions).

In a specific implementation, in an embodiment, the key-value pair retrieval device may further include an output device 106 and an input device 107. The output device 106 communicates with the processor 101, and may display information in a plurality of manners. For example, the output device 106 may be a liquid crystal display (LCD), a light emitting diode (LED) display device, a cathode ray tube (CRT) display device, a projector, or the like. The input device 107 communicates with the processor 101, and may receive user input in a plurality of manners. For example, the input device 107 may be a mouse, a keyboard, a touchscreen device, a sensor device, or the like.

In some embodiments, the memory 103 is configured to store program code 108 for executing the solutions of this application, and the processor 101 may execute the program code 108 stored in the memory 103. The program code may include one or more software modules. The key-value pair retrieval device may implement, by using the processor 101 and the program code 108 in the memory 103, a key-value pair retrieval method provided in the following embodiment in FIG. 2.

It should be noted that, in embodiments of this application, a key-value storage system may be deployed in the key-value pair retrieval device, and the key-value storage system is a database that stores data through a key-value pair. An index of the key-value storage system may be stored in the memory. The processor may perform, based on the index stored in the memory and other related data, data access and deletion in the key-value storage system by using the key-value pair retrieval method described below.

The key-value pair retrieval device may be a server, a terminal device, a cloud device, or the like. This is not limited in embodiments of this application.

The following describes a key-value pair retrieval method provided in an embodiment of this application.

Figure 2:
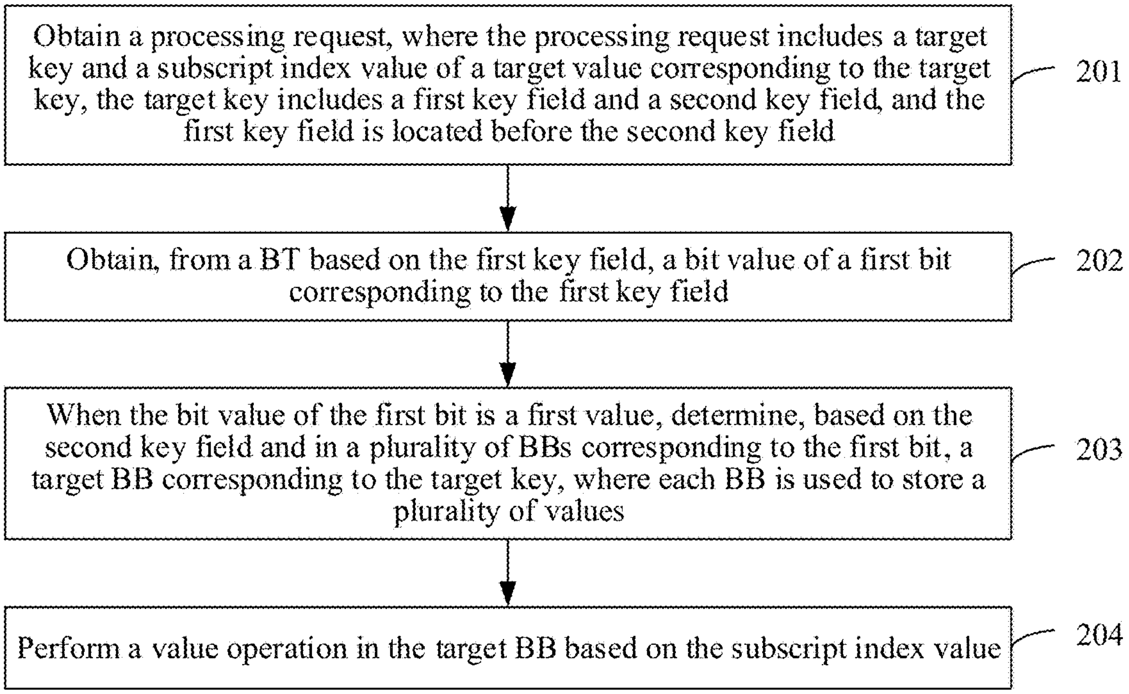
FIG. 2 is a flowchart of a key-value pair retrieval method according to an embodiment of this application.

FIG. 2 is a flowchart of a key-value pair retrieval method according to an embodiment of this application. The method may be applied to the foregoing key-value pair retrieval device. In the following embodiment, the key-value pair retrieval device is referred to as a retrieval device for short. Refer to FIG. 2, the method includes the following steps.

Step 201: Obtain a processing request, where the processing request includes a target key and a subscript index value of a target value corresponding to the target key, the target key includes a first key field and a second key field, and the first key field is located before the second key field.

In this embodiment of this application, the retrieval device may receive a processing request from outside of the device, or generate a processing request based on a user operation. The processing request may be a data insertion request, a data query request, or a data deletion request. When the processing request is the data query request or the data deletion request, the data query request or the data deletion request includes a target key and a subscript index value of a target value corresponding to the target key. In this case, the data query request is used to request to query the target value corresponding to the target key, and the data deletion request is used to request to delete the target value corresponding to the target key. When the processing request is the data insertion request, the data insertion request includes a target key, a target value, and a subscript index value of the target value. The target key and the target value are a to-be-inserted key-value pair, and the subscript index value of the target value indicates a bit that is in a bit vector in a BB and that corresponds to the target value. It should be noted that, in this embodiment of this application, the retrieval device includes a plurality of BBs, and each BB is used to store a plurality of values. For example, each BB can store 64 values. In addition, each BB stores a bit vector, the bit vector includes a plurality of bits, and each bit corresponds to one value stored in the BB. For example, when each BB can store 64 values, the bit vector in the BB includes 64 bits, and each bit corresponds to one value in the BB. For details about the BB, refer to the following descriptions.

After obtaining the processing request, the retrieval device may perform field division on the target key in the processing request, to obtain the first key field and the second key field. The first key field is located before the second key field.

For example, when a length of the target key is greater than 5 bytes, the retrieval device may use the first three bytes of the target key as the first key field, and use the remaining bytes as the second key field.

Step 202: Obtain, from a BT based on the first key field, a bit value of a first bit corresponding to the first key field.

After obtaining the first key field and the second key field of the target key, the retrieval device may retrieve the corresponding first bit in the BT based on the first key field.

It should be noted that in this embodiment of this application, the BT includes a plurality of bits, and each bit corresponds to one key field and a plurality of BBs. A prefix of a key corresponding to a value in the plurality of BBs corresponding to one bit is a key field corresponding to the bit. In addition, a bit value of each bit may be a first value or another value. A bit value of a bit being the first value indicates that a key-value storage system includes a key whose prefix is a key field corresponding to the bit. A bit value of a bit being another value indicates that a key-value storage system does not include a key whose prefix is a key field corresponding to the bit. The first value is 1, and the another value is 0; or the first value is 0, and the another value is 1.

On this basis, the retrieval device may determine, based on the first key field and from the plurality of bits included in the BT, the first bit corresponding to the first key field, and obtain the bit value of the first bit. Then, the retrieval device may determine whether the bit value of the first bit is the first value, and determine, based on the processing request, whether to proceed with subsequent retrieval based on the second key field.

It should be noted that, in this embodiment of this application, the BT may further correspond to a BT read-write lock. The BT read-write lock indicates to perform read-write locking on the BT when the BT is accessed based on a processing request.

The BT read-write lock may be implemented by using a semaphore. For example, when a thread in the retrieval device accesses the BT based on a processing request, the thread may obtain the semaphore. In this way, in a process in which the thread accesses the BT based on the processing request, another thread cannot access the BT. Subsequently, after the thread finishes accessing the BT, the thread may release the semaphore, so that another thread that needs to access the BT subsequently obtains the semaphore. It can be seen that concurrent access to the BT may be controlled by using the BT read-write lock.

Step 203: When the bit value of the first bit is the first value, determine, based on the second key field and in a plurality of BBs corresponding to the first bit, a target BB corresponding to the target key, where each BB is used to store a plurality of values.

If the retrieval device determines that the bit value of the first bit is the first value, it indicates that the key-value storage system includes a key whose prefix is the first key field. In this case, the retrieval device may continue to determine, based on the second key field and in the plurality of BBs corresponding to the first bit, the target BB corresponding to the target key.

It will be appreciated from the foregoing descriptions in step 202 that each bit in the BT corresponds to a plurality of BBs. For example, each bit in the BT may correspond to one hash table, and the hash table may be used to retrieve a plurality of BBs. In this way, each bit corresponds to the plurality of BBs through a corresponding hash table. On this basis, in this step, the retrieval device first obtains a first hash table corresponding to the first bit, and then determines the target BB in the plurality of BBs based on the second key field and the first hash table.

In a possible implementation, each entry of the hash table corresponding to each bit in the BT stores indication information of one BB. In this way, each bit corresponds, through the hash table corresponding to the bit, to a plurality of BBs indicated by the indication information stored in the hash table. On this basis, after obtaining the first hash table corresponding to the first bit, the retrieval device may perform a hash operation on the second key field according to a hash function corresponding to the first hash table, to obtain a corresponding hash value, and then obtain the indication information of the BB in an entry indicated by the hash value in the first hash table. In this case, the obtained indication information of the BB is indication information of the target BB. The retrieval device may determine the target BB based on the obtained indication information of the BB.

It should be noted that the indication information of the BB stored in the hash table corresponding to each bit in the BT may be a pointer pointing to the BB, or may be other information that can uniquely determine the BB. This is not limited in this embodiment of this application.

In another possible implementation, the retrieval device may further divide the second key field to obtain a first subfield and a second subfield. In this case, the retrieval device further includes a plurality of BMs, and each BM is used to store indication information of a hash table middle. Each entry in the hash table middle is used to store indication information of one BB. Correspondingly, each bit in the BT corresponds to a hash table top, and each entry in the hash table top stores indication information of one BM. In this way, each bit in the BT corresponds, through a hash table top corresponding to the bit and a plurality of hash table middles corresponding to the plurality of BMs indicated by indication information stored in the hash table top, to a plurality of BBs indicated by indication information in the plurality of hash table middles. On this basis, after obtaining a hash table top corresponding to the first bit, namely, the first hash table, the retrieval device may determine, based on the first subfield and the first hash table, a target BM corresponding to the target key, where the target BM stores indication information of a second hash table; obtain the second hash table based on the indication information of the second hash table, where the second hash table stores indication information of the plurality of BBs; and determine the target BB based on the second subfield and the second hash table.

The retrieval device first performs a hash operation on the first subfield according to a hash function corresponding to the first hash table, to obtain a first hash value, and then obtains indication information of a BM in an entry indicated by the first hash value in the first hash table. In this case, the obtained indication information of the BM is indication information of the target BM. The retrieval device may determine the target BM based on the indication information of the target BM, and obtain the indication information of the second hash table from the target BM. Then, the retrieval device obtains the second hash table based on the indication information of the second hash table, and performs a hash operation on the second subfield according to a hash function corresponding to the second hash table, to obtain a second hash value. Then, the retrieval device obtains the indication information of the BB in an entry indicated by the second hash value in the second hash table. In this case, the obtained indication information of the BB is the indication information of the target BB. The retrieval device can determine the target BB based on the indication information of the target BB.

It should be noted that both the indication information of the BM stored in the hash table top and the indication information of the hash table middle stored in the BM may be pointers pointing to the corresponding BM and the hash table middle, or other information that can uniquely determine the BM and the hash table middle. This is not limited in this embodiment of this application.

In addition, in this embodiment of this application, each BM in the retrieval device may also have a corresponding BM read-write lock. In this way, in a process in which the retrieval device accesses a BM based on a processing request, the BM may be locked, to prevent the retrieval device from accessing the BM based on another processing request. For an implementation of the BM read-write lock, refer to the foregoing described implementation of the BT read-write lock. Details are not described herein again in this embodiment of this application.

Optionally, in some possible cases, the bit value of the first bit may not be the first value, in other words, the key-value storage system does not store a key whose prefix is the first key field. In this case, if the processing request is a data insertion request, the retrieval device first creates a corresponding first hash table for the first bit, and sets a bit value of the first bit to the first value. Then, the retrieval device performs the hash operation on the first subfield according to the hash function corresponding to the first hash table, to obtain the first hash value, stores the indication information of the target BM in the entry indicated by the first hash value in the first hash table, and creates the target BM based on the indication information of the target BM. Then, the retrieval device stores the indication information of the second hash table in the target BM, and creates the second hash table based on the indication information of the second hash table. Then, the retrieval device performs the hash operation on the second subfield according to the hash function corresponding to the second hash table, to obtain the second hash value, and stores, in the entry indicated by the second hash value in the second hash table, indication information of a BB that currently has not stored a value, where the BB is the target BB.

It will be appreciated that, if the retrieval device does not include a BM, the retrieval device may directly store, in the entry indicated by the first hash value in the first hash table in the foregoing manner, indication information of a BB that currently has not stored a value, where the BB is the target BB.

Optionally, if the processing request is a data deletion request or a data query request, the retrieval device ends the operation when the bit value of the first bit is not the first value.

Step 204: Perform a value operation in the target BB based on the subscript index value.

After determining the target BB, the retrieval device may perform, in the target BB based on the subscript index value in the processing request, the value operation corresponding to the processing request.

It will be appreciated from the foregoing descriptions that the BB is used to store a plurality of values. In this embodiment of this application, the BB may store a value in two different manners. Based on different manners in which the BB stores the value, implementations in which the retrieval device performs the value operation in the target BB based on the subscript index value are also different.

In a first implementation, the BB stores a plurality of values by storing a reference value and a value compression table, where the reference value is any value stored in the BB. The value compression table is used to store difference information between another value and the reference value. In this way, the plurality of values can be restored based on the difference information stored in the value compression table and the reference value. In this case, the retrieval device may perform, in the value compression table based on the subscript index value, the reference value, and the value compression table, the value operation corresponding to the processing request.

For example, the value compression table may include a plurality of single difference entries, one single difference entry is used to store one piece of difference information, the difference information includes an abrupt change position, an abruptly changed byte, and a corresponding bit vector, the abrupt change position indicates a position of a changed byte in the another value compared with the reference value, the abruptly changed byte is a changed byte in the another value compared with the reference value, the bit vector includes a plurality of bits, one bit corresponds to one value, and a bit value of a bit that is in the plurality of bits and that corresponds to the another value is a second value. When an initial bit value of the plurality of bits is 0, the second value may be 1. When an initial bit value of the plurality of bits is 1, the second value may be 0. In addition, in this embodiment of this application, a value corresponding to the $1^{st}$ bit in the bit vector may be the reference value.

It should be noted that in this embodiment of this application, lengths of the values stored in one BB are the same. In addition, a quantity of bits included in the bit vector in each single difference entry in the value compression table in one BB is the same, and is equal to a quantity of values that can be stored in the BB. For example, when the target BB can store 64 values, the bit vector in each single difference entry in the value compression table in the target BB includes 64 bits, and each bit indicates one value. For any value, a bit corresponding to the value may be indicated by using a subscript index value of the value. For example, when a subscript index value of a value is 0, a bit corresponding to the value is the $1^{st}$ bit in the bit vector; when a subscript index value of a value is 4, a bit corresponding to the value is the $5^{th}$ bit in the bit vector; and so on. In addition, when a bit value of a bit in a bit vector in a single difference entry is the second value, it indicates that a byte at an abrupt change position included in the single difference entry in a value corresponding to the bit is different from a byte at the abrupt change position in the reference value, in other words, the byte at the abrupt change position in the value corresponding to the bit is an abruptly changed byte included in the single difference entry.

Because difference information stored in a single difference entry includes an abrupt change position, an abruptly changed byte, and a bit vector, in this embodiment of this application, a single difference entry in the value compression table may include three fields: a first field, a second field, and a third field, where the first field is used to store the abrupt change position, the second field is used to store the abruptly changed byte, and the third field is used to store the bit vector.

Figure 3:
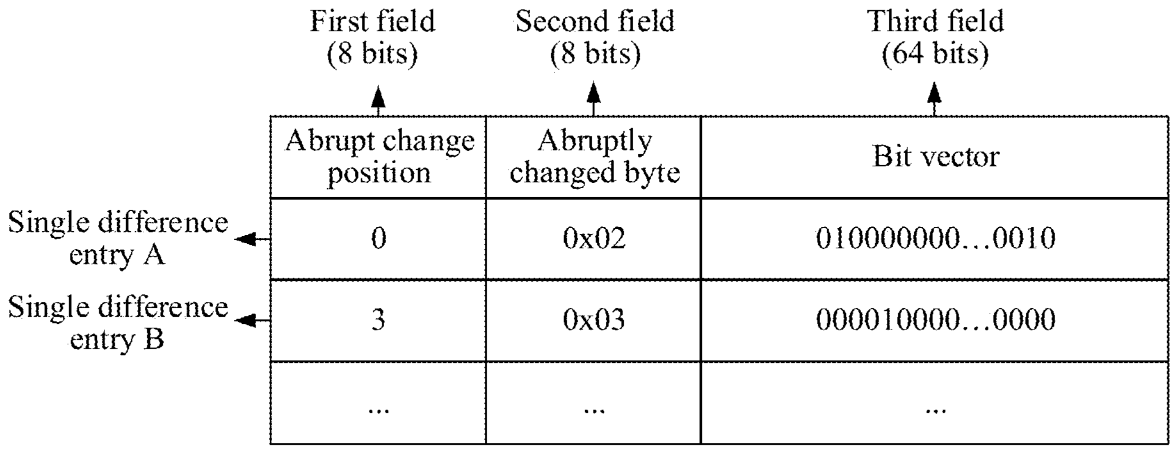
FIG. 3 is a diagram of a value compression table according to an embodiment of this application.

FIG. 3 shows an example of a single difference entry in a value compression table according to an embodiment of this application. It is assumed that a length of each of the 64 values stored in the target BB is 8 bytes. In comparison with the reference value, a position of an abrupt changed byte in another value may be any one of a $1^{st}$ byte to an $8^{th}$ byte. In this way, an abrupt change position in a single difference entry may be represented by an 8-bit value, in other words, a length of the first field is 8 bits. A value range of the 8-bit value may be 0 to 7, where 0 indicates that the abrupt change position is the $1^{st}$ byte, 7 indicates that the abrupt change position is the $8^{th}$ byte, and so on. In addition, the second field in the single difference entry is used to store the abruptly changed byte, and a length of one abruptly changed byte is also 8 bits. In addition, the third field in the single difference entry is used to store the bit vector. Because the target BB can store 64 values, the bit vector includes 64 bits, in other words, a length of the bit vector is 64 bits. In this way, a single difference entry occupies 10 bytes. As shown in FIG. 3, an abrupt change position in a single difference entry A is 0, and an abruptly changed byte is 0x02. In this case, when a bit value of a bit in a bit vector in the single difference entry A is the second value, for example, 1, it indicates that a $1^{st}$ byte in a value corresponding to the bit is different from a $1^{st}$ byte in the reference value, where the $1^{st}$ byte in the value corresponding to the bit is 0x02. For another example, if an abrupt change position in a single difference entry B is 3, and an abruptly changed byte is 0x03, when a bit value of a bit in a bit vector in the single difference entry B is 1, it indicates that a $4^{th}$ byte in a value corresponding to the bit is different from a $4^{th}$ byte in the reference value, where the $4^{th}$ byte in the value corresponding to the bit is 0x03.

Optionally, in a possible implementation, the value compression table in this embodiment of this application may further include at least one aggregated difference entry in addition to the single difference entry. In this embodiment of this application, the at least one includes one or more, and at least n includes n or more. One aggregated difference entry is obtained by aggregating a plurality of single difference entries including a same first abrupt change position and different abruptly changed bytes, the aggregated difference entry includes an aggregation identifier, the first abrupt change position, and a byte storage field, and the byte storage field sequentially stores, based on a sequence of values corresponding to the bits in the bit vector, bytes located at the first abrupt change position in the values. If a value corresponding to a bit is not stored in the target BB, a byte at the first abrupt change position in the value corresponding to the bit is a byte at the first abrupt change position in the reference value.

It should be noted that, in some cases, abruptly changed bytes of values at a same abrupt change position may be different. For example, there are 8 values, and a $1^{st}$ byte in each value is abruptly changed relative to a $1^{st}$ byte in the reference value, in other words, the $1^{st}$ byte in each value is different from the $1^{st}$ byte in the reference value, and the $1^{st}$ bytes in the 8 values are also different. In this way, abrupt changes of the 8 values need to be separately stored as 8 single difference entries. When there are a large quantity of single difference entries with a same abrupt change position but different abruptly changed bytes, storage overheads are increased. On this basis, in this embodiment of this application, a plurality of single difference entries including a same abrupt change position and different abruptly changed bytes may be aggregated, to obtain an aggregated difference entry, thereby reducing the storage overheads of the entry.

For example, for a plurality of single difference entries that are included in the value compression table and that have a same abrupt change position but different abruptly changed bytes, the retrieval device may count whether a quantity of the plurality of single difference entries is less than a first threshold, where the first threshold may be determined based on a byte length that needs to be occupied by one aggregated difference entry and a byte length that needs to be occupied by one single difference entry.

One aggregated difference entry may include an aggregation identifier, an abrupt change position, and a byte storage field. The aggregation identifier may be represented by a 1-bit flag bit, and a byte length occupied by the abrupt change position may be determined based on a byte length of a value stored in the target BB. For example, if the value stored in the target BB is a value whose length is 8 bytes, the byte length occupied by the abrupt change position may be 7 bits. Because the byte storage field is used to store a byte at an abrupt change position that is included in the aggregated difference entry and that is in a value corresponding to each bit in the bit vector, for a bit whose corresponding value is not stored in the target BB, a byte at the abrupt change position in the reference value is stored in the position corresponding to the bit. In this way, a byte length occupied by the byte storage field is the length of the value stored in the target BB. For example, if the value stored in the target BB is a value whose length is 8 bytes, the byte storage field occupies 8 bytes. A byte occupied by an abrupt change position in a single difference entry may also be determined based on a byte length of a value stored in the target BB. For example, if the value stored in the target BB is a value whose length is 8 bytes, the byte length occupied by the abrupt change position may be 7 or 8 bits. A byte length occupied by the abruptly changed byte is 8 bits, and a byte length occupied by the bit vector is a quantity of bits that is equal to a quantity of values that can be stored in the target BB. For example, if the target BB can store 64 values, the bit vector occupies 64 bits. On this basis, the retrieval device may calculate a ratio of the byte length that needs to be occupied by one aggregated difference entry to the byte length that needs to be occupied by one single difference entry, and determine the first threshold based on the ratio. For example, in the foregoing example, the byte length that needs to be occupied by one aggregated difference entry is 65 bytes, and one single difference entry needs to occupy 10 bytes. In this case, the retrieval device determines that a ratio of the two is 6.5. In this case, the retrieval device may use an integer greater than 6.5 as the first threshold. For example, the first threshold is 7, 8, or another value. In this way, when a quantity of the plurality of single difference entries including a same abrupt change position but different abruptly changed bytes is no less than the first threshold, in other words, when there are 7 or more such single difference entries, after the single difference entries are aggregated, all abrupt changes that may occur at the abrupt change position can be recorded by using 65 bytes. However, if the single difference entries are used to record these differences, more than 65 bytes are needed. Therefore, storage space occupied by the value compression table can be reduced by performing aggregation.

It should be noted that, to avoid changing a structure of the value compression table as much as possible, in this embodiment of this application, the aggregated difference entry may be implemented by occupying fields included in a plurality of single difference entries. For example, the aggregated difference entry may store the aggregation identifier and the abrupt change position by using an occupied first field in the $1^{st}$ single difference entry. In this case, the most significant bit of the first field in the $1^{st}$ single difference entry may be used as a flag bit of the aggregation identifier. When a value of the flag bit is 1, the flag bit indicates that the entry is an aggregated difference entry. The remaining bits of the first field may indicate the abrupt change position. A second field in the $1^{st}$ single difference entry may be empty, or the second field may be used to store a quantity of types of the abruptly changed byte included in a subsequent byte storage field. Because a length occupied by a byte stored in the byte storage field may be far greater than a byte length occupied by a bit vector in a single difference entry, the byte storage field in the aggregated difference entry may be implemented by using a third field in the 1st single difference entry and the remaining field included in the single difference entry.

Figure 4:
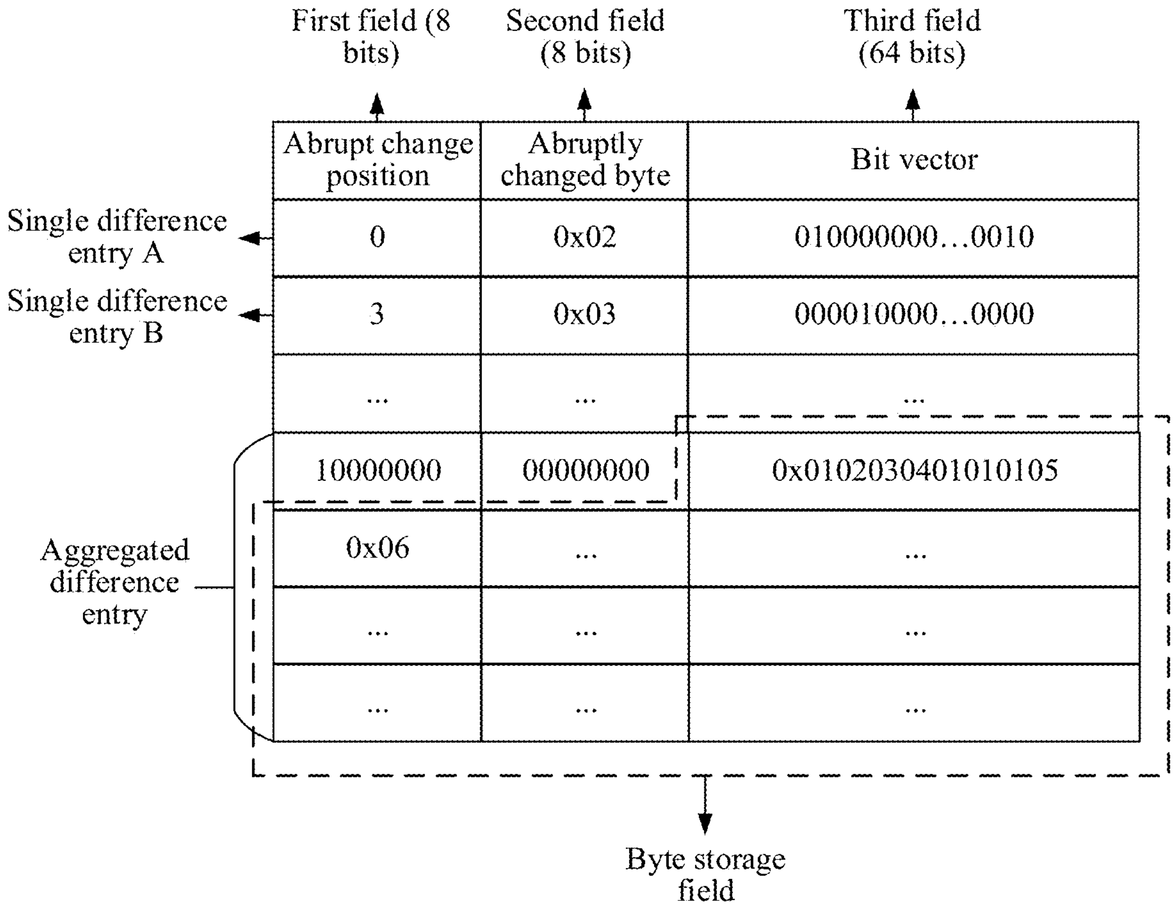
FIG. 4 is a diagram of another value compression table according to an embodiment of this application.

For example, when the target BB can store 64 values and a length of each value is 8 bytes, a first field in a single difference entry occupies 8 bits, a second field occupies 8 bits, and a third field occupies 64 bits. In this case, refer to FIG. 4, a bit value of the most significant bit of the first field in the 1st single difference entry that is occupied by the aggregated difference entry is 1, and is used to identify the entry as an aggregated difference entry, and the remaining bit of the first field indicates that a first abrupt change position is 0. In other words, the subsequent byte storage field stores a 1st byte in each value or the reference value. The second field in the occupied 1st single difference entry is empty. The third field in the 1st single difference entry stores, based on a sequence of bits in a bit vector, bytes located at the first abrupt change position in the values corresponding to each bit. For example, the 1st bit in the bit vector corresponds to the reference value, and the 1st byte in the reference value is 0x01. 1st bytes in values corresponding to the 2nd bit to the 4th bit are respectively 0x02, 0x03, and 0x04, and values corresponding to the 5th bit to the 7th bit are not stored in the target BB. Therefore, all the three positions store the 1st byte in the reference value, and a 1st byte in a value corresponding to the 8th bit is 0x05. Because the third field in the 1st single difference entry stores a maximum of 8 bytes, a 1st byte in a value corresponding to the 9th bit in the bit vector is stored in a first field in an occupied next single difference entry. For example, if the 1st byte in the value corresponding to the 9th bit is 0x06, 0x06 is stored in the first field in the next single difference entry, a 1st byte in a value corresponding to the 10th bit is stored in a second field in the next single difference entry, and so on, until 1st bytes in values corresponding to all bits in the bit vector are stored.

In a possible implementation, after single difference entries are aggregated, an aggregated difference entry group may also be obtained. In other words, in this embodiment of this application, in addition to the single difference entries, the value compression table may further include at least one aggregated difference entry group. One aggregated difference entry group is obtained by aggregating a plurality of single difference entries including a same abrupt change position and different abruptly changed bytes, one aggregated difference entry group includes a plurality of aggregated difference entries, each aggregated difference entry includes an aggregation identifier, an abrupt change position, and a byte storage field, all abrupt change positions in the plurality of aggregated difference entries are a first abrupt change position, and each of a plurality of byte storage fields in the plurality of aggregated difference entries sequentially stores, based on a sequence of values corresponding to the bits in the bit vector, bytes located at the first abrupt change position in the values. If a value corresponding to a bit is not stored in the target BB, a byte at the first abrupt change position in the value corresponding to the bit is a byte at the first abrupt change position in the reference value.

For example, for a plurality of single difference entries that are included in the value compression table and that have a same abrupt change position but different abruptly changed bytes, the retrieval device may count whether a quantity of the plurality of single difference entries is less than a first threshold, where the first threshold may be a quantity of aggregated difference entries that need to be occupied when abruptly changed bytes at a same position in all values that can be stored in the target BB other than the reference value are different, or a value greater than the quantity. For example, when the target BB can store 64 values, and all abruptly changed bytes at a same position in 63 values are different, the abrupt change position corresponds to 63 abruptly changed bytes. To ensure that a structure of the value compression table remains unchanged, the 63 bytes may be stored by using an original bit vector field in a single difference entry. Because one bit vector field in one entry can store 8 bytes, bit vector fields in 8 entries are needed to store the 63 bytes, in other words, an aggregated difference entry group obtained by aggregation includes 8 aggregated difference entries. In this case, the first threshold may be set to 8 or a value greater than 8. In this way, when the quantity of the plurality of single difference entries including a same abrupt change position but different abruptly changed bytes is no less than the first threshold, after the plurality of single difference entries are aggregated, a quantity of aggregated difference entries included in the obtained aggregated difference entry group is no greater than the quantity of the plurality of single difference entries, and occupied storage space is less than storage space occupied by the plurality of single difference entries. This helps reduce storage overheads of entries.

Figures 5, 6:
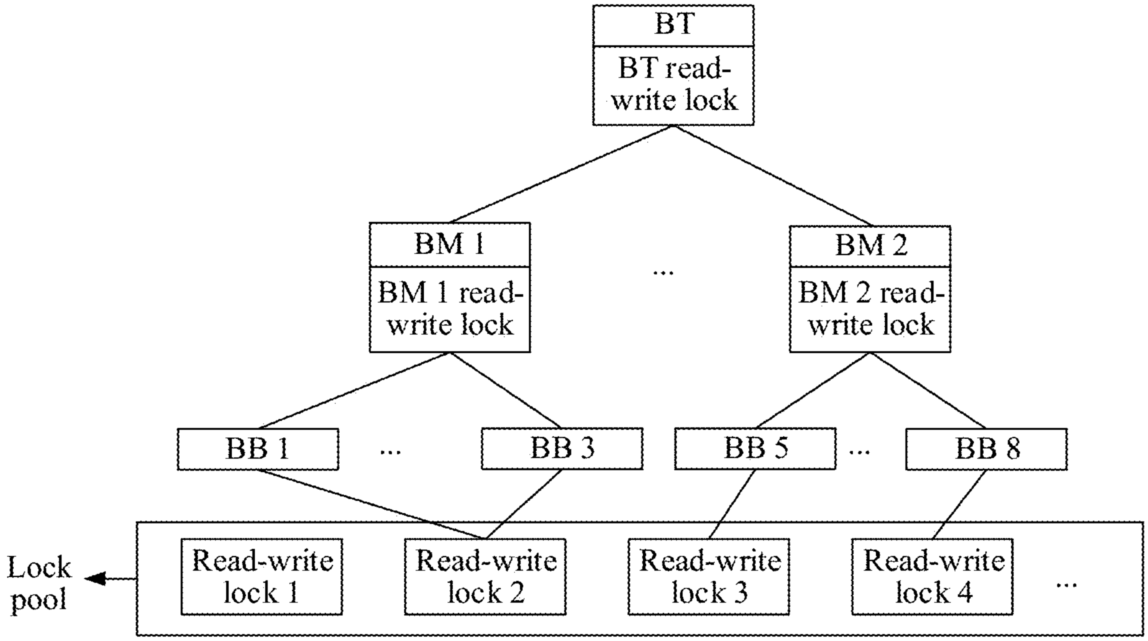
FIG. 5 is a diagram of still another value compression table according to an embodiment of this application.
FIG. 6 is a diagram of BT, BM, and BB read-write locks according to an embodiment of this application.

For example, the target BB can store 64 values, and the first threshold is 8. When there are 8 single difference entries in which all included abrupt change positions are the first abrupt change positions but abruptly changed bytes are different, the retrieval device may aggregate the 8 single difference entries to obtain one aggregated difference entry group. The aggregated difference entry group includes 8 aggregated difference entries, and each aggregated difference entry includes an aggregation identifier, an abrupt change position, and a byte storage field. Refer to FIG. 5. To ensure that a structure of the value compression table remains unchanged, each aggregated difference entry also includes a first field, a second field, and a third field. A difference is that the most significant bit of the first field may be used as a flag bit, and a value of the flag bit indicates that the entry is an aggregated difference entry. For example, when the value of the flag bit is 1, it indicates that the entry is an aggregated difference entry; or when the value of the flag bit is 0, it indicates that the entry is a single difference entry. The remaining bits of the first field may indicate the abrupt change position. The second field in each aggregated difference entry may be empty, and the third field may be used to store, based on a sequence of values corresponding to the bits in the bit vector, a byte at the abrupt change position in each value, in other words, the third field is a byte storage field. For example, refer to FIG. 5. In the 1st aggregated difference entry in the aggregated difference entry group, a first abrupt change position stored in the first field is 0, and indicates that a 1st byte in a value is different from the reference value; the second field is empty; and the third field, that is, the byte storage field, stores 8 bytes, where the 8 bytes are 1st bytes in values corresponding to first 8 bits in a bit vector in a single difference entry. It should be noted that, if a value corresponding to a bit in the first 8 bits in the bit vector is not stored in the target BB, a 1st byte in the reference value may be stored at a position corresponding to the bit in the byte storage field. For example, refer to FIG. 5. The 1st bit in the bit vector corresponds to the reference value, the 1st byte in the reference value is 0x01, 1st bytes of values corresponding to the 2nd bit to the 4th bit in the bit vector are respectively 0x02, 0x03, and 0x04, values corresponding to the 5th bit to the 7th bit are not stored in the target BB, and a 1st bytes in a value corresponding to the 8th bit is 0x05. In this case, a byte stored in the byte storage field in the $1^{st}$ aggregated difference entry is 0x0102030401010105. Similarly, the first field in the $2^{nd}$ aggregated difference entry in the aggregated difference entry group still stores the first abrupt change position, the second field is still empty, and the third field is still the byte storage field, used to store $1^{st}$ bytes in values corresponding to next 8 bits in the bit vector, and so on.

It can be seen that, when the quantity of the plurality of single difference entries that include a same abrupt change position but different abruptly changed bytes and that are in the value compression table is no less than the first threshold, a minimum of a first threshold quantity of single difference entries is needed. If an abruptly changed byte at the abrupt change position in a subsequently inserted value is different from the plurality of single difference entries, a single difference entry needs to be further added. In this way, the quantity of the plurality of single difference entries including the abrupt change position but different abruptly changed bytes exceeds the first threshold. However, after the plurality of single difference entries are aggregated by using the method provided in this embodiment of this application, a quantity of aggregated difference entries included in the obtained aggregated difference entry group is no greater than the first threshold. Even if the abruptly changed byte at the abrupt change position in the subsequently inserted value is different from the plurality of single difference entries, a byte at a position corresponding to the value in the byte storage field in the aggregated difference entry group may be changed. Because a byte length occupied by one single difference entry is the same as a byte length occupied by one aggregated difference entry, after the plurality of single difference entries are aggregated, a quantity of entries is reduced, and storage space occupied by the entries is also reduced. This helps reduce storage overheads of the value compression table.

Optionally, in some possible cases, the aggregated difference entry included in the aggregated difference entry group may further include a quantity of types of abruptly changed bytes stored in a plurality of byte storage fields included in the aggregated difference entry group. The quantity of types of abruptly changed bytes may be stored in the second field.

For example, when an abrupt change position included in an aggregated difference entry group is a position A, m bytes in a plurality of bytes stored in the plurality of byte storage fields in the aggregated difference entry group are different from a byte at the position A in the reference value. In this case, a quantity of abruptly changed bytes stored in the aggregated difference entry group is m. In this case, m may be stored in the second field in the $1^{st}$ aggregated difference entry in the aggregated difference entry group. Alternatively, m may be stored in the second field in any one or each aggregated difference entry in the aggregated difference entry group.

It will be appreciated from the descriptions in step 201 that the processing request may be any one of a data insertion request, a data query request, and a data deletion request. On this basis, based on the foregoing value compression table, the retrieval device may perform different value operations for different processing requests.

In a first case, when the processing request is a data insertion request, the retrieval device compares each byte in a target value included in the data insertion request with a corresponding byte in the reference value in the target BB, to obtain an abrupt change position and an abruptly changed byte in the target value; and then inserts difference information between the target value and the reference value into the value compression table based on a subscript index value, and the abrupt change position and the abruptly changed byte in the target value.

The retrieval device may compare the target value in the data insertion request with the reference value in the target BB byte by byte, to be specific, compare a $1^{st}$ byte in the target value with a $1^{st}$ byte in the reference value, compare the second byte in the target value with the second byte in the reference value, and so on, to obtain bytes that are different from bytes corresponding to the reference value and that are included in a plurality of bytes of the target value. These bytes that are different from the bytes corresponding to the reference value are abruptly changed bytes in the target value. The retrieval device may record each abruptly changed byte in the target value and a position of the abruptly changed byte in the target value, and use the position as the abrupt change position. There may be one or more abruptly changed bytes in the target value, and correspondingly, there may be one or more abrupt change positions at which the abruptly changed bytes are located.

After the abruptly changed byte and the abrupt change position in the target value are obtained, any abruptly changed byte and an abrupt change position at which the abruptly changed byte is located are used as an example. For ease of description, the abrupt change position is referred to as a position A, and the abruptly changed byte is referred to as a byte a. The retrieval device may search the value compression table of the target BB for whether a first single difference entry including the position A and the byte a exists. If the first single difference entry is found, it indicates that this type of abrupt change has occurred in some of the values stored in the current target BB compared with the reference value. In this case, the retrieval device may update a bit value of the $n^{th}$ bit in a bit vector in the first single difference entry to a second value based on a subscript index value. When a minimum value of the subscript index value is 0, n is equal to the subscript index value plus 1. If a minimum value of the subscript index value is 1, n is equal to the subscript index value.

It should be noted that the subscript index value of the target value can indicate a bit that is in the bit vector and that corresponds to the target value. On this basis, the retrieval device can determine, based on the subscript index value of the target value, that the $n^{th}$ bit in the bit vector in the first single difference entry is the bit corresponding to the target value. In this case, the retrieval device may update the bit value of the $n^{th}$ bit in the bit vector in the first single difference entry to the second value, to indicate that a byte at the position A of the target value is the byte a, and is different from a byte at the position A of the reference value.

Optionally, if the retrieval device does not find, in the value compression table of the target BB, the first single difference entry including the position A and the byte a, the retrieval device may directly generate the bit vector of the target value. In this case, the bit value of the bit that corresponds to the target value and that is in the bit vector of the target value is the second value, and the remaining value is 0. Then, the retrieval device may generate a single difference entry based on the position A, the byte a, and the bit vector of the target value, and then insert the single difference entry into the value compression table.

When inserting the generated single difference entry into the value compression table, the retrieval device may search for a single difference entry in which an abrupt change position included in the target BB is the position A. If the single difference entry in which the abrupt change position is the position A exists, the generated single difference entry is inserted after the found single difference entry.

Optionally, if the retrieval device does not find, in the value compression table of the target BB, the first single difference entry including the position A and the byte a, but a second single difference entry including the position A exists in the value compression table, the retrieval device may also determine, based on a quantity of second single difference entries included in the value compression table, whether to directly generate a single difference entry based on the position A and the byte a, or obtain an aggregated difference entry group based on the plurality of second single difference entries, the position A, and the byte a.

For example, the retrieval device may compare the quantity of second single difference entries with the first threshold. When the quantity of second single difference entries included in the value compression table is less than the first threshold, the retrieval device generates a bit vector of the target value based on the subscript index value. A bit value of the $n^{th}$ bit in the bit vector of the target value is the second value. When a minimum value of the subscript index value is 0, n is equal to the subscript index value plus 1. If a minimum value of the subscript index value is 1, n is equal to the subscript index value. Alternatively, the retrieval device generates a single difference entry based on the abrupt change position, the abruptly changed byte, and the bit vector of the target value, and inserts the generated single difference entry into the value compression table.

It should be noted that, if the quantity of second single difference entries included in the value compression table is less than the first threshold, it indicates that the value compression table includes a small quantity of single difference entries in which the abrupt change position is the position A but abruptly changed bytes are different. In this case, even if the plurality of second single difference entries are aggregated, a quantity of aggregated difference entries in the obtained aggregated difference entry group may not be less than the quantity of a plurality of second single difference entries. In this case, there are little or even no benefits of storage overheads brought by aggregating the plurality of second single difference entries. On this basis, the retrieval device may directly generate the bit vector of the target value based on the subscript index value, then generate a single difference entry based on the position A, the byte a, and the bit vector, and insert the generated single difference entry after the last second single difference entry in the plurality of second single difference entries.

Optionally, if the quantity of second single difference entries included in the value compression table is no less than the first threshold, it indicates that the value compression table includes a large quantity of single difference entries in which the abrupt change position is the position A but abruptly changed bytes are different. In this case, the retrieval device may aggregate the plurality of second single difference entries, the abruptly changed bytes of the target value, and the subscript index value, to obtain a target aggregated difference entry group in which a quantity of aggregated difference entries is no greater than the first threshold, to improve entry utilization and reduce a quantity of entries, thereby reducing the storage overheads of the value compression table.

It should be noted that the retrieval device may generate the target aggregated difference entry group with reference to the foregoing method for aggregating a plurality of single difference entries. Then, the retrieval device may determine, based on the subscript index value, an $n^{th}$ byte from a plurality of bytes stored in a plurality of byte storage fields included in the target aggregated difference entry group. The $n^{th}$ byte is changed to an abruptly changed byte at the position A in the target value, that is, is changed to the byte a.

Optionally, if the retrieval device does not find, in the value compression table, a single difference entry in which the abrupt change position is the position A, but finds an aggregated difference entry or an aggregated difference entry group including the position A, the retrieval device may also directly insert the byte a into the aggregated difference entry or the aggregated difference entry group based on the subscript index value. When the byte a is inserted into the aggregated difference entry or the aggregated difference entry group, the retrieval device may determine an $n^{th}$ byte from a plurality of bytes stored in a byte storage field included in the aggregated difference entry or the aggregated difference entry group. The $n^{th}$ byte is changed to an abruptly changed byte at the position A in the target value, that is, is changed to the byte a.

It should be noted that, after the $n^{th}$ byte is changed to the abruptly changed byte at the position A in the target value, if the aggregated difference entry or the aggregated difference entry group further includes a quantity of types of abruptly changed bytes, the retrieval device may re-count a quantity of types of abruptly changed bytes that are in the plurality of bytes stored in the byte storage fields and that are different from a byte at the position A in the reference value. If the quantity of types remains unchanged, the operation ends. If the quantity of types increases, in other words, the abruptly changed byte like the byte a does not exist in the previous byte storage field, the retrieval device adds 1 to the quantity of types of abruptly changed bytes, to complete updating.

The foregoing describes a process in which when the processing request is a data insertion request, the retrieval device inserts, based on the value compression table, the target value in the data insertion request into the value compression table. The following describes a process in which when the processing request is a data query request or a data deletion request, the retrieval device obtains a target value corresponding to a target key in the data query request or the data deletion request.

In a second case, when the processing request is a data query request, and the value compression table in the target BB includes a third single difference entry, the target value is obtained based on an abrupt change position and an abruptly changed byte in the third single difference entry, an $n^{th}$ byte in a plurality of byte storage fields included in each aggregated difference entry group in the value compression table, and the reference value, where the third single difference entry is a single difference entry in which a bit value of the $n^{th}$ bit in the bit vector is a second value.

The retrieval device may first obtain the reference value. Then, the retrieval device starts to traverse from the $1^{st}$ entry of the value compression table. For any entry, the retrieval device may determine, based on a bit value of the most significant bit of a first field in the entry, whether the entry is a single difference entry or an aggregated difference entry. If the entry is a single difference entry, the retrieval device detects, based on a subscript index value, whether a bit value of the $n^{th}$ bit in the bit vector in the single difference entry is the second value, and if the bit value of the $n^{th}$ bit in the bit vector in the single difference entry is the second value, it indicates that a byte that is in the target value and that is at an abrupt change position included in the single difference entry is an abruptly changed byte in the single difference entry. In this case, the retrieval device may change a byte that is in the reference value and that is at the abrupt change position included in the single difference entry to the abruptly changed byte in the single difference entry. Alternatively, if the bit value of the $n^{th}$ bit in the bit vector in the single difference entry is not the second value, it indicates that, compared with the reference value, the target value does not change at the abrupt change position included in the single difference entry, in other words, a byte in the target value at the abrupt change position is the same as a byte in the reference value at the abrupt change position. In this case, the retrieval device keeps the byte at the abrupt change position in the reference value unchanged, and then continues to query a next entry.

Optionally, when a plurality of single difference entries in the value compression table are aggregated to obtain an aggregated difference entry group, if the retrieval device determines, based on the bit value of the most significant bit of the first field in the entry, that the entry is an aggregated difference entry, the retrieval device may obtain another aggregated difference entry that includes a same abrupt change position as the aggregated difference entry, to determine an aggregated difference entry group to which the aggregated difference entry belongs. Then, the retrieval device may obtain, based on the subscript index value, the $n^{th}$ byte stored in the plurality of byte storage fields in the aggregated difference entry group. Then, based on the abrupt change position included in the aggregated difference entry group, a byte at the abrupt change position in the reference value is replaced with the obtained byte. When a plurality of single difference entries in the value compression table are aggregated to obtain an aggregated difference entry, if the retrieval device determines, based on the bit value of the most significant bit of the first field in the entry, that the entry is an aggregated difference entry, the retrieval device may obtain the $n^{th}$ byte stored in the byte storage field in the aggregated difference entry, and then replace, based on the abrupt change position included in the aggregated difference entry, the byte at the abrupt change position in the reference value with the obtained byte.

In this way, entries in the value compression table are traversed one by one by using the foregoing method, and the final value obtained by modifying the reference value is the target value.

In a third case, when the processing request is a data deletion request, if the value compression table includes a third single difference entry, a bit value of the $n^{th}$ bit in a bit vector in the third single difference entry is updated to a third value, where the third single difference entry is a single difference entry in which the bit value of the $n^{th}$ bit in the bit vector is a second value, and the third value is different from the second value. When the value compression table includes a first aggregated difference entry group, an $n^{th}$ byte in a plurality of byte storage fields in the first aggregated difference entry group is updated to a byte at a second abrupt change position in the reference value based on the second abrupt change position included in the first aggregated difference entry group, where the $n^{th}$ byte in the plurality of byte storage fields in the first aggregated difference entry group is an abruptly changed byte at the second abrupt change position in the target value.

The retrieval device may traverse entries in the value compression table with reference to the foregoing manner of processing the data query request. If an entry is a single difference entry, and a bit value of the $n^{th}$ bit in the single difference entry is the second value, it indicates that a byte that is in the target value and that is at an abrupt change position included in the single difference entry is an abruptly changed byte in the single difference entry, in other words, the byte at the abrupt change position in the target value is different from the byte at the abrupt change position in the reference value. In this case, the retrieval device may change the bit value of the $n^{th}$ bit in the bit vector in the single difference entry to the third value, to delete a difference that is between the target value and the reference value and that is in the abrupt change position. When the second value is 1, the third value is 0. When the second value is 0, the third value is 1.

Optionally, after the retrieval device changes the bit value of the $n^{th}$ bit in the bit vector in the single difference entry to the third value, if no bit whose bit value is the second value exists in the bit vector, the retrieval device may delete the single difference entry.

If an entry is an aggregated difference entry, the retrieval device may obtain, based on a subscript index value, the $n^{th}$ byte in the byte storage field in the aggregated difference entry or the first aggregated difference entry group to which the aggregated difference entry belongs, and obtain a byte at the second abrupt change position in the reference value based on the second abrupt change position included in the aggregated entry. If the obtained two bytes are different, it indicates that the $n^{th}$ byte in the byte storage field is an abruptly changed byte at the second abrupt change position in the target value. In this case, the retrieval device may change the $n^{th}$ byte in the byte storage field to a byte at the second abrupt change position in the reference value, to delete a difference that is between the target value and the reference value and that is in the second abrupt change position.

It should be noted that, if the aggregated difference entry further includes a quantity of types of abruptly changed bytes included in the byte storage field, after the $n^{th}$ byte in the byte storage field is changed to the byte at the second abrupt change position in the reference value, the retrieval device may further re-count the quantity of types of abruptly changed bytes included in the byte storage field with reference to the manner described above, to determine whether to update the quantity of types of currently stored abruptly changed bytes.

In this way, after entries in the value compression table are traversed one by one by using the foregoing method to delete the difference that is between the target value and the reference value and that is in each byte, the target value is deleted.

It should be noted that, in this embodiment of this application, after the retrieval device deletes, by using the method described above, the difference that is between the target value and the reference value, that is in the second abrupt change position, and that is recorded in the aggregated difference entry or the first aggregated entry group to which the aggregated difference entry belongs, if a quantity of types of abruptly changed bytes in a byte storage field in an updated aggregated difference entry or first aggregated difference entry group is less than a first threshold, the aggregated difference entry or the first aggregated difference entry group to which the aggregated difference entry belongs is split into a plurality of single difference entries.

It will be appreciated from the foregoing descriptions that, the aggregated difference entry or the aggregated difference entry group may include a quantity of types of abruptly changed bytes included in the byte storage field. In this case, the retrieval device may obtain the quantity of types of abruptly changed bytes. If the quantity of types of abruptly changed bytes is less than the first threshold, it indicates that even if the updated aggregated difference entry or first aggregated difference entry group is split, a quantity of single difference entries obtained is less than the first threshold, and storage space occupied by the plurality of single difference entries is less than storage space occupied by the aggregated difference entry or the first aggregated entry group. In this case, the retrieval device may restore the updated aggregated difference entry or first aggregated difference entry group to the plurality of single difference entries.

The aggregated difference entry group is used as an example. The retrieval device may, starting from a first aggregated difference entry in the updated first aggregated difference entry group, use an abrupt change position in the aggregated difference entry as an abrupt change position in a single difference entry, use a 1st abruptly changed byte in a byte storage field in the aggregated difference entry as the abruptly changed byte in the single difference entry, determine, based on a position of the abruptly changed byte in a plurality of bytes in a plurality of byte storage fields included in the aggregated difference entry group, a corresponding bit in a bit vector of a value corresponding to the abruptly changed byte, and then generate a bit vector of the single difference entry based on the corresponding bit in the bit vector of the value corresponding to the abruptly changed byte, where a bit value of the bit corresponding to the value corresponding to the abruptly changed byte in the bit vector of the single difference entry is the second value, and the remaining bits are third values.

After the 1st single difference entry is obtained by splitting, the retrieval device continues to obtain a second abruptly changed byte in the byte storage field in the 1st aggregated difference entry. If the second abruptly changed byte is the same as an abruptly changed byte in the single difference entry obtained by splitting, a corresponding bit in a bit vector of a value corresponding to the second abruptly changed byte is determined based on a position of the second abruptly changed byte in the plurality of bytes in the plurality of byte storage fields included in the aggregated difference entry group. Then, a bit value of the corresponding bit in the bit vector in the single difference entry obtained by splitting is updated to the second value based on the corresponding bit in the bit vector of the value corresponding to the second abruptly changed byte. Alternatively, if the second abruptly changed byte is different from the abruptly changed byte in the single difference entry obtained by splitting, a single difference entry may be obtained, based on the second abruptly changed byte with reference to the method described above, by splitting.

According to the foregoing method, the retrieval device may traverse the abruptly changed bytes in the plurality of byte storage fields, to sequentially obtain, by splitting, a plurality of single difference entries with a quantity less than the first threshold.

If an aggregated difference entry is obtained by compressing the plurality of single difference entries in the value compression table, the retrieval device may also sequentially obtain, based on the plurality of bytes stored in the byte storage fields in the aggregated difference entry with reference to the foregoing method, the plurality of single difference entries by splitting.

Optionally, in some possible cases, the quantity of types of abruptly changed bytes may not be recorded in the aggregated difference entry. In this case, the retrieval device may alternatively obtain the byte at the second abrupt change position in the reference value. Then, a quantity of types of bytes that are different from the obtained byte and that are in the plurality of bytes stored in the byte storage fields in the updated aggregated difference entry or first aggregated difference entry group is counted based on the obtained byte. The quantity of types is a quantity of types of abruptly changed bytes in the updated aggregated difference entry or first aggregated difference entry group. If the quantity of types of abruptly changed bytes is less than the first threshold, the retrieval device may split the updated aggregated difference entry or first aggregated difference entry group with reference to the foregoing manner, to obtain a plurality of single difference entries.

Optionally, in some possible cases, after the retrieval device deletes the target value in the target BB based on the data deletion request, the target BB may become empty, in other words, the target BB no longer stores a value. In this case, if the retrieval device includes a BM, the retrieval device may further delete indication information of the target BB stored in an entry indicated by a second hash value in the second hash table determined in step 203. Further, if all entries in the second hash table are empty, the retrieval device may delete the second hash table, delete indication information of the second hash table stored in a target BM, and then delete indication information of the target BM stored in an entry indicated by a first hash value in a first hash table. Further, if all entries in the first hash table are empty, the retrieval device deletes the first hash table, and sets a bit value of a first bit to another value other than a first value.

Similarly, if the retrieval device does not include a BM, the retrieval device may delete indication information of the target BB stored in an entry indicated by a hash value in a second key field in the hash table that corresponds to a first bit and that is determined in step 203. If all entries in the hash table corresponding to the first bit are empty, the retrieval device deletes the hash table, and sets a bit value of the first bit to another value other than a first value.

The foregoing describes an implementation in which when the target BB stores a plurality of values by using the reference value and the value compression table, the retrieval device performs, in the target BB based on the value compression table, a value operation corresponding to the processing request.

Optionally, in another possible implementation, the target BB may directly store one bit vector and a plurality of values. The bit vector includes a plurality of bits, and each bit indicates one value. When a bit value of a bit is the second value, the value indicates that the target BB stores a value corresponding to the bit. In this case, the bit corresponds to one value. When a bit is the third value, the value indicates that the target BB does not store a value corresponding to the bit. In this case, the bit has no corresponding value.

On this basis, when the processing request is a data insertion request, the retrieval device first determines, based on a subscript index value in the data insertion request, a bit that is in the bit vector and that corresponds to the target value. If a bit value of the bit that is in the bit vector and that corresponds to the target value is the second value, it indicates that the target BB already stores a value corresponding to a target key. In this case, the retrieval device may replace the value corresponding to the bit in the target BB with the target value. If a bit value of the bit that is in the bit vector and that corresponds to the target value is the third value, it indicates that the target BB does not store a value corresponding to a target key. In this case, the retrieval device may store the target value as the value corresponding to the bit, and then change the bit value of the bit to the second value.

Optionally, when the processing request is a data query request, the retrieval device first determines a corresponding bit in the bit vector based on a subscript index value in the data query request. If the bit value of the determined bit is the second value, a value corresponding to the bit is obtained, and the obtained value is the target value. If the bit value of the determined bit is the third value, a query result indicating that a value corresponding to a target key is not found is generated.

Optionally, when the processing request is a data deletion request, the retrieval device first determines a corresponding bit in the bit vector based on a subscript index value in the data deletion request. If the bit value of the determined bit is the second value, a value corresponding to the bit is deleted. If the bit value of the determined bit is the third value, a deletion failure message is generated.

Optionally, in this embodiment of this application, the retrieval device further includes a lock pool. The lock pool may include a plurality of read-write locks, and at least one of the plurality of read-write locks corresponds to at least two BBs. The at least one includes one or more, and the at least two includes two or more. For example, one read-write lock in the plurality of read-write locks corresponds to two or more BBs, or one read-write lock corresponds to one BB. In other words, in the plurality of read-write locks, there is a read-write lock shared by a plurality of BBs. Each of the plurality of read-write locks may be distinguished through a read-write lock label. In this way, the retrieval device may store a correspondence between the BB and a read-write lock label corresponding to the BB. On this basis, before performing the value operation in the target BB, the retrieval device may further obtain, from the lock pool based on the read-write lock label of the target BB, a read-write lock corresponding to the target BB, to perform read-write locking on the target BB in a process of performing the value operation in the target BB. Subsequently, after the value operation in the target BB ends, the retrieval device may release the read-write lock corresponding to the target BB, so that the read-write lock can be used by another BB corresponding to the read-write lock.

For an implementation of the BB read-write lock, refer to the foregoing described implementation of the BT read-write lock. Details are not described herein again in this embodiment of this application.

It should be noted that because there are a large quantity of BBs, in this embodiment of this application, a plurality of BBs may share a same read-write lock. In this way, space consumption of the read-write lock can be reduced.

For example, FIG. 6 is a diagram of BT, BM, and BB read-write locks according to an embodiment of this application. As shown in FIG. 6, a BT corresponds to a BT read-write lock, each of a plurality of BMs corresponds to a BM read-write lock, and each BM correspond to a different BM read-write lock. Read-write locks of a plurality of BBs may be obtained from a lock pool, and one read-write lock in the lock pool may be shared by a plurality of BBs, or one BB may use one independent read-write lock. For example, a BB 1 and a BB 3 share a read-write lock 2, a BB 5 independently uses a read-write lock 3, and a BB 8 independently uses a read-write lock 4.

Based on the key-value pair retrieval method described above, in this embodiment of this application, a simulation test is performed on index performance of a key-value storage database to which the method is applied. A 12-byte key and an 8-byte value are used as an example. The key is divided into a 3-byte first key field, and a second key field with a 3-byte first subfield and a 6-byte second subfield. Each BB stores a maximum of 64 values. An initial key-value pair is (0, 0). The test steps are as follows: Generate 6 billion key-value pairs based on a model of a key increment of 1 and a value increment of 0x2000. Insert the 6 billion key-value pairs into the key-value storage database, and check space actually occupied. Insert 10,000 key-value pairs in sequence, and check an average delay of data insertion. Delete 10,000 key-value pairs, with a key interval of 64 in each key-value pair, and check an average delay of data deletion. In addition, randomly query 10,000 key-value pairs, and check an average delay of data query.

After the 6 billion key-value pairs are inserted into the key-value storage database, the space actually occupied by the BT, the BM, the BB, a hash table top corresponding to the BT, and a hash table middle corresponding to the BM, and total space occupied by all the foregoing information are shown in Table 1 below.

TABLE 1

Storage space occupied by each part of an index in a simulation test

| Module | BT | BM | BB | Hash table |
|---|---|---|---|---|
| Occupied space | 130 MB | 64 B | 21.65 GB | 4.89 GB |
| Total space | | | 26.67 GB | |

It will be appreciated that, in comparison with space actually occupied by the 6 billion key-value pairs, a compression rate of the space actually occupied by the index provided in this embodiment of this application reaches 23.8%.

The average delay of the data insertion, the average delay of the data deletion, and the average delay of the data query are shown in Table 2 below.

TABLE 2

Average delay of various operations in a simulation test

| Operation | Data insertion | Data query | Data deletion |
|---|---|---|---|
| Delay (ns) | 1132.8 | 511.5 | 875.5 |

It will be appreciated that, based on the operation method provided in this embodiment of this application, delays of various operations can be controlled within 1 microsecond as much as possible.

In this embodiment of this application, first, the key is divided into a plurality of key fields. Then, a corresponding first bit is determined from the BT based on the first key field in a front part. Finally, a target BB is determined, based on the second key field in a rear part, from a plurality of BBs corresponding to the first bit. In this way, for keys having a same first key field, a plurality of same BBs can be located through the BT. In other words, in embodiments of this application, indexes of a common part of the keys are integrated, thereby reducing a proportion of space occupied by the index.

Second, when a retrieval device further includes the BM, the retrieval device may further divide the second key field, to retrieve the corresponding BM based on the first subfield in a front part and a first hash table, to obtain a second hash table in the BM. In this way, for keys that also include the first key field and a prefix of the first subfield, BBs corresponding to these keys can be retrieved through a hash table (that is, the second hash table), thereby reducing a data scale of the hash table and improving operation efficiency of the hash table. In addition, indexes of more common parts of the keys can be integrated through the BT and the BM, thereby further reducing the proportion of the space occupied by the index.

Third, in this embodiment of this application, during the data insertion, for a key that is not stored, corresponding data may be created and inserted in the BT, the hash table top, or the hash table middle in a retrieval process, to insert a target value into the target BB. During the data deletion, a corresponding element recorded in the BT, the BM, the BB, or the hash table may be deleted in a retrieval process. It will be appreciated that in this embodiment of this application, during the data insertion or deletion, a structure of the index does not need to be reconstructed, and dynamic update performance of the index is high.

Finally, in this embodiment of this application, a plurality of values may be stored in the BB by storing a reference value and difference information between another value and the reference value. In this way, storage of redundant fields in the plurality of values can be reduced, thereby reducing storage space occupied by the value and improving a value compression rate.

The following describes a key-value pair retrieval apparatus provided in an embodiment of this application.

Figure 7:
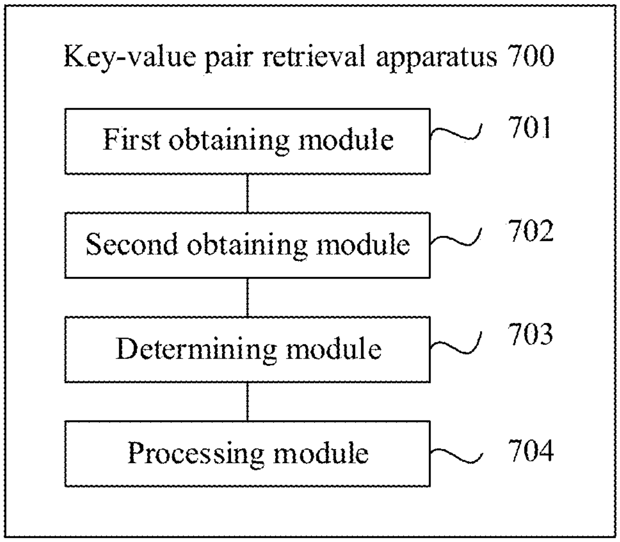
FIG. 7 is a diagram of a structure of a key-value pair retrieval apparatus according to an embodiment of this application.

FIG. 7 is a diagram of a structure of a key-value pair retrieval apparatus according to an embodiment of this application. As shown in FIG. 7, a key-value pair retrieval apparatus 700 includes a first obtaining module 701, a second obtaining module 702, a determining module 703, and a processing module 704.

The first obtaining module 701 is configured to perform step 201 in the foregoing embodiment.

The second obtaining module 702 is configured to perform step 202 in the foregoing embodiment.

The determining module 703 is configured to perform step 203 in the foregoing embodiment.

The processing module 704 is configured to perform step 204 in the foregoing embodiment.

It should be noted that the foregoing modules may be implemented by executing, by a processor in the foregoing key-value pair retrieval device, computer instructions stored in a memory.

Optionally, the determining module 703 is configured to:

obtain a first hash table corresponding to a first bit; and determine a target BB in a plurality of BBs based on a second key field and the first hash table.

Optionally, the second key field includes a first subfield and a second subfield, and the determining module 703 is configured to:

determine, based on the first subfield and the first hash table, a target bitmap middle BM corresponding to a target key, where the target BM stores indication information of a second hash table;

obtain the second hash table based on the indication information of the second hash table, where the second hash table stores indication information of the plurality of BBs; and determine the target BB based on the second subfield and the second hash table.

Optionally, the target BB stores a reference value and a value compression table, where the value compression table is used to store difference information between another value and the reference value.

Optionally, the value compression table includes a plurality of single difference entries, one single difference entry is used to store one piece of difference information, the difference information includes an abrupt change position, an abruptly changed byte, and a corresponding bit vector, the abrupt change position indicates a position of a changed byte in the another value compared with the reference value, the abruptly changed byte is a changed byte in the another value compared with the reference value, the bit vector includes a plurality of bits, one bit corresponds to one value, and a bit value of a bit that is in the plurality of bits and that corresponds to the another value is a second value.

Optionally, the value compression table further includes at least one aggregated difference entry, one aggregated difference entry is obtained by aggregating a plurality of single difference entries including a same first abrupt change position and different abruptly changed bytes, the aggregated difference entry includes an aggregation identifier, the first abrupt change position, and a byte storage field, and the byte storage field sequentially stores, based on a sequence of values corresponding to the bits in the bit vector, bytes located at the first abrupt change position in the values.

Optionally, the processing request is a data insertion request, the data insertion request further includes a target value, and the processing module 704 is configured to:

compare each byte in the target value with a corresponding byte in the reference value, to obtain an abrupt change position and an abruptly changed byte in the target value; and insert difference information between the target value and the reference value into the value compression table based on the subscript index value, and the abrupt change position and the abruptly changed byte in the target value.

Optionally, the processing module 704 is configured to:

when the value compression table includes a first single difference entry, update a bit value of the $n^{th}$ bit in a bit vector in the first single difference entry to the second value, where n is determined based on the subscript index value, and the first single difference entry is a single difference entry including the abrupt change position and the abruptly changed byte in the target value.

Optionally, the processing module 704 is configured to:

when the value compression table does not include the abruptly changed byte in the target value, and a quantity of second single difference entries included in the value compression table is less than a first threshold, generate a bit vector of the target value based on the subscript index value, where a bit value of the $n^{th}$ bit in the bit vector of the target value is the second value, n is determined based on the subscript index value, and the second single difference entry is a single difference entry including the abrupt change position of the target value; and generate a single difference entry based on the abrupt change position, the abruptly changed byte, and the bit vector of the target value, and insert the generated single difference entry into the value compression table.

Optionally, the processing module 704 is configured to:

when the value compression table does not include the abruptly changed byte in the target value, and a quantity of second single difference entries included in the value compression table is no less than a first threshold, aggregate the second single difference entry, the abruptly changed byte in the target value, and the subscript index value, to obtain a target aggregated difference entry, where the second single difference entry is a single difference entry including the abrupt change position of the target value, the first threshold is greater than 1, and storage space occupied by the target aggregated difference entry is no greater than storage space occupied by the plurality of second single difference entries.

Optionally, the processing request is a data query request, and the processing module 704 is configured to:

when the value compression table includes a third single difference entry, obtain the target value based on an abrupt change position and an abruptly changed byte in the third single difference entry, an $n^{th}$ byte in a byte storage field included in each aggregated difference entry in the value compression table, and the reference value, where the third single difference entry is a single difference entry in which a bit value of the $n^{th}$ bit in a bit vector is the second value, and n is determined based on the subscript index value.

Optionally, the processing request is a data deletion request, and the processing module 704 is configured to:

when the value compression table includes a third single difference entry, update a bit value of the $n^{th}$ bit in a bit vector of the third single difference entry to a third value, where the third single difference entry is a single difference entry in which the bit value of the $n^{th}$ bit in the bit vector is the second value, n is determined based on the subscript index value, and the third value is different from the second value; and when the value compression table includes a first aggregated difference entry, update, based on a second abrupt change position included in the first aggregated difference entry, an $n^{th}$ byte in a byte storage field in the first aggregated difference entry to a byte at the second abrupt change position in the reference value, where the $n^{th}$ byte in the byte storage field in the first aggregated difference entry is an abruptly changed byte at the second abrupt change position in the target value.

Optionally, the processing module 704 is further configured to:

when a quantity of abruptly changed bytes in a byte storage field in an updated first aggregated difference entry is less than a first threshold, split the first aggregated difference entry into a plurality of single difference entries.

Optionally, a BT corresponds to a BT read-write lock, where the BT read-write lock indicates to perform read-write locking on the BT when the BT is accessed based on the processing request.

Optionally, the apparatus 700 is further configured to:

obtain, from a lock pool based on a read-write lock label of the target BB, a read-write lock corresponding to the target BB, where the read-write lock corresponding to the target BB indicates to perform read-write locking on the target BB in a process of performing a value operation in the target BB based on the subscript index value, the lock pool includes a plurality of read-write locks, and at least one of the plurality of read-write locks corresponds to at least two BBs.

Optionally, the apparatus 700 is further configured to:

release the read-write lock corresponding to the target BB.

In this embodiment of this application, a key is divided into a plurality of key fields. Then, a corresponding first bit is determined from the BT based on a first key field in a front part. Finally, the target BB is determined, based on the second key field in a rear part, from a plurality of BBs corresponding to the first bit. In this way, for keys having a same first key field, a plurality of same BBs can be located through the BT. In other words, in embodiments of this application, indexes of a common part of the keys are integrated, thereby reducing a proportion of space occupied by the index.

It should be noted that, when the key-value pair retrieval apparatus provided in the foregoing embodiment performs retrieval, the division of the foregoing function modules is merely used as an example for description. In actual application, the foregoing functions may be allocated to and implemented by different function modules according to a requirement, in other words, an inner structure of a device is divided into different function modules to implement all or some of the foregoing functions described above. In addition, the key-value pair retrieval apparatus and the key-value pair retrieval method embodiments provided in the foregoing embodiments share a same concept. For a specific implementation process, refer to the method embodiments. Details are not described herein again.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, processes or functions according to embodiments of this application are wholly or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are not intended to limit embodiments of this application. Any modification, equivalent replacement, or improvement made without departing from the spirit and principle of embodiments of this application may fall within the protection scope of embodiments of this application.

What is claimed is:

1. A key-value pair retrieval method, wherein the method comprises:

obtaining, by a key-value pair retrieval device, a processing request, wherein the processing request comprises a target key and a subscript index value of a target value corresponding to the target key, wherein the target key comprises a first key field and a second key field, and wherein the first key field is located before the second key field;

obtaining, by the key-value pair retrieval device, from a bitmap top (BT) based on the first key field, a bit value of a first bit corresponding to the first key field;

based on the bit value of the first bit being a first value, determining, by the key-value pair retrieval device, based on the second key field and in a plurality of bitmap bottoms (BBs) corresponding to the first bit, a target bitmap bottom (BB) corresponding to the target key, wherein each BB stores a plurality of values; and performing, by the key-value pair retrieval device, a value operation in the target BB based on the subscript index value;

wherein before performing the value operation in the target BB, the method further comprises:

obtaining, from a lock pool based on a read-write lock label of the target BB, a read-write lock corresponding to the target BB, wherein the read-write lock corresponding to the target BB indicates to perform read-write locking on the target BB in a process of performing the value operation in the target BB based on the subscript index value, wherein the lock pool comprises a plurality of read-write locks, and wherein at least one of the plurality of read-write locks corresponds to at least two BBs.

2. The method according to claim 1, wherein determining the target BB corresponding to the target key comprises:

obtaining a first hash table corresponding to the first bit; and determining the target BB from the plurality of BBs based on the second key field and the first hash table.

3. The method according to claim 2, wherein the second key field comprises a first subfield and a second subfield, and wherein determining the target BB from the plurality of BBs based on the second key field and the first hash table comprises:

determining, based on the first subfield and the first hash table, a target bitmap middle (BM) corresponding to the target key, wherein the target BM stores indication information of a second hash table;

obtaining the second hash table based on the indication information of the second hash table, wherein the second hash table stores indication information of the plurality of BBs; and determining the target BB based on the second subfield and the second hash table.

4. The method according to claim 1, wherein the target BB stores a reference value and a value compression table, wherein the value compression table stores difference information between another value and the reference value.

5. The method according to claim 4, wherein the value compression table comprises a plurality of single difference entries, wherein one single difference entry stores one piece of difference information, wherein the difference information comprises an abrupt change position, an abruptly changed byte, and a corresponding bit vector, wherein the abrupt change position indicates a position of a changed byte in the another value compared with the reference value, wherein the abruptly changed byte is a changed byte in the another value compared with the reference value, wherein the bit vector comprises a plurality of bits, wherein one bit corresponds to one value, and wherein a bit value of a bit of the plurality of bits and that corresponds to the another value is a second value.

6. The method according to claim 5, wherein the value compression table further comprises at least one aggregated difference entry, wherein one aggregated difference entry is obtained by aggregating a plurality of single difference entries comprising a same first abrupt change position and different abruptly changed bytes, wherein the aggregated difference entry comprises an aggregation identifier, the first abrupt change position, and a byte storage field, and wherein the byte storage field sequentially stores, based on a sequence of values corresponding to the bits in the bit vector, bytes located at the first abrupt change position in the values.

7. The method according to claim 5, wherein the processing request is a data insertion request, wherein the data insertion request further comprises the target value, and wherein performing the value operation in the target BB based on the subscript index value comprises:

comparing each byte in the target value with a corresponding byte in the reference value, to obtain an abrupt change position and an abruptly changed byte in the target value; and inserting difference information between the target value and the reference value into the value compression table based on the subscript index value, and the abrupt change position and the abruptly changed byte in the target value.

8. The method according to claim 1, wherein the BT corresponds to a BT read-write lock, wherein the BT read-write lock indicates to perform read-write locking on the BT when the BT is accessed based on the processing request.

9. The method according to claim 1, wherein after performing the value operation in the target BB based on the subscript index value, the method further comprises:

releasing the read-write lock corresponding to the target BB.

10. A key-value pair retrieval device, comprising:

a processor; and a memory having a computer program stored thereon;

wherein the processor is configured to execute the computer program stored in the memory to facilitate performance of the following by the key-value pair retrieval device:

obtaining a processing request, wherein the processing request comprises a target key and a subscript index value of a target value corresponding to the target key, wherein the target key comprises a first key field and a second key field, and wherein the first key field is located before the second key field;

obtaining, from a bitmap top (BT) based on the first key field, a bit value of a first bit corresponding to the first key field;

based on the bit value of the first bit being a first value, determining, based on the second key field and in a plurality of bitmap bottoms (BBs) corresponding to the first bit, a target bitmap bottom (BB) corresponding to the target key, wherein each BB stores a plurality of values; and performing a value operation in the target BB based on the subscript index value;

wherein the processor is further configured to execute the computer program stored in the memory to facilitate performance of the following by the key-value pair retrieval device before performing the value operation in the target BB:

obtaining, from a lock pool based on a read-write lock label of the target BB, a read-write lock corresponding to the target BB, wherein the read-write lock corresponding to the target BB indicates to perform read-write locking on the target BB in a process of performing the value operation in the target BB based on the subscript index value, wherein the lock pool comprises a plurality of read-write locks, and wherein at least one of the plurality of read-write locks corresponds to at least two BBs.

11. The device according to claim 10, wherein determining the target BB corresponding to the target key comprises:

obtaining a first hash table corresponding to the first bit; and determining the target BB from the plurality of BBs based on the second key field and the first hash table.

12. The device according to claim 11, wherein the second key field comprises a first subfield and a second subfield, and wherein determining the target BB from the plurality of BBs based on the second key field and the first hash table comprises:

determining, based on the first subfield and the first hash table, a target bitmap middle (BM) corresponding to the target key, wherein the target BM stores indication information of a second hash table;

obtaining the second hash table based on the indication information of the second hash table, wherein the second hash table stores indication information of the plurality of BBs; and determining the target BB based on the second subfield and the second hash table.

13. The device according to claim 10, wherein the target BB stores a reference value and a value compression table, and wherein the value compression table stores difference information between another value and the reference value.

14. The device according to claim 13, wherein the value compression table comprises a plurality of single difference entries, wherein one single difference entry stores one piece of difference information, wherein the difference information comprises an abrupt change position, an abruptly changed byte, and a corresponding bit vector, wherein the abrupt change position indicates a position of a changed byte in the another value compared with the reference value, wherein the abruptly changed byte is a changed byte in the another value compared with the reference value, wherein the bit vector comprises a plurality of bits, wherein one bit corresponds to one value, and wherein a bit value of a bit of the plurality of bits and that corresponds to the another value is a second value.

15. The device according to claim 14, wherein the value compression table further comprises at least one aggregated difference entry, wherein one aggregated difference entry is obtained by aggregating a plurality of single difference entries comprising a same first abrupt change position and different abruptly changed bytes, wherein the aggregated difference entry comprises an aggregation identifier, the first abrupt change position, and a byte storage field, and wherein the byte storage field sequentially stores, based on a sequence of values corresponding to the bits in the bit vector, bytes located at the first abrupt change position in the values.

16. The device according to claim 14, wherein the processing request is a data insertion request, wherein the data insertion request further comprises the target value, and wherein performing the value operation in the target BB based on the subscript index value comprises:

comparing each byte in the target value with a corresponding byte in the reference value, to obtain an abrupt change position and an abruptly changed byte in the target value; and inserting difference information between the target value and the reference value into the value compression table based on the subscript index value, and the abrupt change position and the abruptly changed byte in the target value.

17. The device according to claim 10, wherein the BT corresponds to a BT read-write lock, wherein the BT read-write lock indicates to perform read-write locking on the BT when the BT is accessed based on the processing request.

18. A non-transitory computer-readable storage medium, wherein the non-transitory computer-readable storage medium has processor-executable instructions stored thereon, wherein the processor-executable instructions, when executed, facilitate performance of the following:

obtaining a processing request, wherein the processing request comprises a target key and a subscript index value of a target value corresponding to the target key, wherein the target key comprises a first key field and a second key field, and wherein the first key field is located before the second key field;

obtaining, from a bitmap top (BT) based on the first key field, a bit value of a first bit corresponding to the first key field;

based on the bit value of the first bit being a first value, determining, based on the second key field and in a plurality of bitmap bottoms (BBs) corresponding to the first bit, a target bitmap bottom (BB) corresponding to the target key, wherein each BB stores a plurality of values; and performing a value operation in the target BB based on the subscript index value;

wherein the processor-executable instructions, when executed, further facilitate performance of the following before performing the value operation in the target BB:

obtaining, from a lock pool based on a read-write lock label of the target BB, a read-write lock corresponding to the target BB, wherein the read-write lock corresponding to the target BB indicates to perform read-write locking on the target BB in a process of performing the value operation in the target BB based on the subscript index value, wherein the lock pool comprises a plurality of read-write locks, and wherein at least one of the plurality of read-write locks corresponds to at least two BBs.

19. The non-transitory computer-readable storage medium according to claim 18, wherein the processor-executable instructions, when executed, further facilitate performance of the following after performing the value operation in the target BB based on the subscript index value:

releasing the read-write lock corresponding to the target BB.

20. The device according to claim 10, wherein the processor is further configured to execute the computer program stored in the memory to facilitate performance of the following by the key-value pair retrieval device after performing the value operation in the target BB based on the subscript index value:

releasing the read-write lock corresponding to the target BB.

* * * * *